US012779770B2

(12) United States Patent
Yoshioka et al.

(10) Patent No.: US 12,779,770 B2
(45) Date of Patent: Nov. 3, 2026

(54) COATING APPARATUS

(71) Applicants: Taikisha Ltd., Tokyo (JP); FU-SE VACUUM FORMING LTD., Habikino (JP)

(72) Inventors: Hidehisa Yoshioka, Zama (JP); Yoshio Higashi, Suita (JP); Yoshikazu Hayashi, Sagamihara (JP); Seidai Watanabe, Yamato (JP); Yoichi Kumon, Habikino (JP); Hitoshi Okamoto, Habikino (JP)

(73) Assignees: Taikisha Ltd., Tokyo (JP); Fu-Se Vacuum Forming Ltd., Habikino (JP)

( * ) Notice: Subject to any disclaimer, the term of this patent is extended or adjusted under 35 U.S.C. 154(b) by 67 days.

(21) Appl. No.: 18/741,220

(22) Filed: Jun. 12, 2024

(65) Prior Publication Data

US 2024/0416581 A1 Dec. 19, 2024

(30) Foreign Application Priority Data

Jun. 19, 2023 (JP) ................................ 2023-100242

(51) Int. Cl.
*B29C 63/00* (2006.01)
*B29C 63/02* (2006.01)

(52) U.S. Cl.
CPC ...... *B29C 63/0073* (2013.01); *B29C 63/0065* (2013.01); *B29C 63/0091* (2013.01); *B29C 63/024* (2013.01); *B29C 63/025* (2013.01)

(58) Field of Classification Search
CPC ........... B29C 63/0073; B29C 63/0065; B29C 63/0091; B29C 63/024; B29C 63/025; B29C 63/02; B29C 63/0004; B29C 63/0078; B29C 51/10; B29C 51/262; B29C 51/38; B29C 65/7841; B29C 66/8167;
(Continued)

(56) References Cited

U.S. PATENT DOCUMENTS 5,264,058 A * 11/1993 Hoagland ......... B32B 17/10018
156/286
2018/0141264 A1 5/2018 Miura

FOREIGN PATENT DOCUMENTS

JP 2002-240099 A 8/2002
JP 2016-140996 A 8/2016
(Continued)

OTHER PUBLICATIONS

Machine translation of JP 2016-140996 date unknown.*

*Primary Examiner* — John L Goff, II
(74) *Attorney, Agent, or Firm* — .Buchanan Ingersoll & Rooney PC

(57) ABSTRACT

A coating apparatus includes a support unit configured to support a film over a work to be coated. The support unit includes first support unit and second support unit which are arranged with a distance therebetween in a first direction so as to be positioned on both sides of the work. The first support unit includes a first lower member and a first upper member which vertically hold therebetween a first end of the film. The second support unit includes a second lower member and a second upper member which vertically hold therebetween a second end of the film. Each of the first lower member and the second lower member includes a support surface which extends in a second direction intersecting with the first direction while curving in an up-down direction, and is configured to support the film from below.

8 Claims, 30 Drawing Sheets

(58) Field of Classification Search
CPC ................. B29C 66/344; B29C 33/306; Y10T 156/1028; Y10T 156/103; B32B 38/1866; B32B 2038/0028
USPC ................................. 156/212, 213, 229, 475
See application file for complete search history.

(56) References Cited

FOREIGN PATENT DOCUMENTS

| | | | | |
|---|---|---|---|---|
| JP | 2021-062625 A | | 4/2021 | |
| WO | WO-2015022810 A1 | * | 2/2015 | ............. B29C 51/06 |

* cited by examiner

COATING APPARATUS

CROSS-REFERENCE TO RELATED APPLICATION(S)

This application claims priority to and the benefit of Japanese Patent Application No. 2023-100242 filed on Jun. 19, 2023, the entire disclosure of which is incorporated herein by reference.

BACKGROUND OF THE INVENTION

Field of the Invention

The present invention relates to a coating apparatus.

Description of the Related Art

A forming method is known in which a three-dimensional work to be coated is coated with a film. For example, Japanese Patent Laid-Open No. 2021-62625 discloses a method of coating an automobile or the like with a film that is stretched into a flat state.

In a case where a three-dimensional work to be coated is coated with a film that is stretched into a flat state, the distance between the work to be coated and the film varies and hence the amount by which the film is stretched varies in some areas of the work to be coated; this causes the occurrence of wrinkles.

SUMMARY OF THE INVENTION

It is an object of the present invention to suppress differences in the amount by which a film is stretched in different areas of a work to be coated.

According to the present invention, there is provided a coating apparatus comprising a support unit configured to support a film over a work to be coated, the work to be coated being coated with the film supported by the support unit, wherein the support unit includes first support unit and second support unit which are arranged with a distance therebetween in a first direction so as to be positioned on both sides of the work to be coated, wherein the first support unit includes a first lower member and a first upper member which vertically hold therebetween a first end of the film in the first direction, wherein the second support unit includes a second lower member and a second upper member which vertically hold therebetween a second end of the film, the second end being on an opposite side of the first end in the first direction, and wherein each of the first lower member and the second lower member includes a support surface which extends in a second direction intersecting with the first direction while curving in an up-down direction, and is configured to support the film from below.

Further features of the present invention will become apparent from the following description of exemplary embodiments (with reference to the attached drawings).

BRIEF DESCRIPTION OF THE DRAWINGS

FIG. 6 is a diagram illustrating the operations of the coating system of

FIG. 1.

DESCRIPTION OF THE EMBODIMENTS

Figure 1:
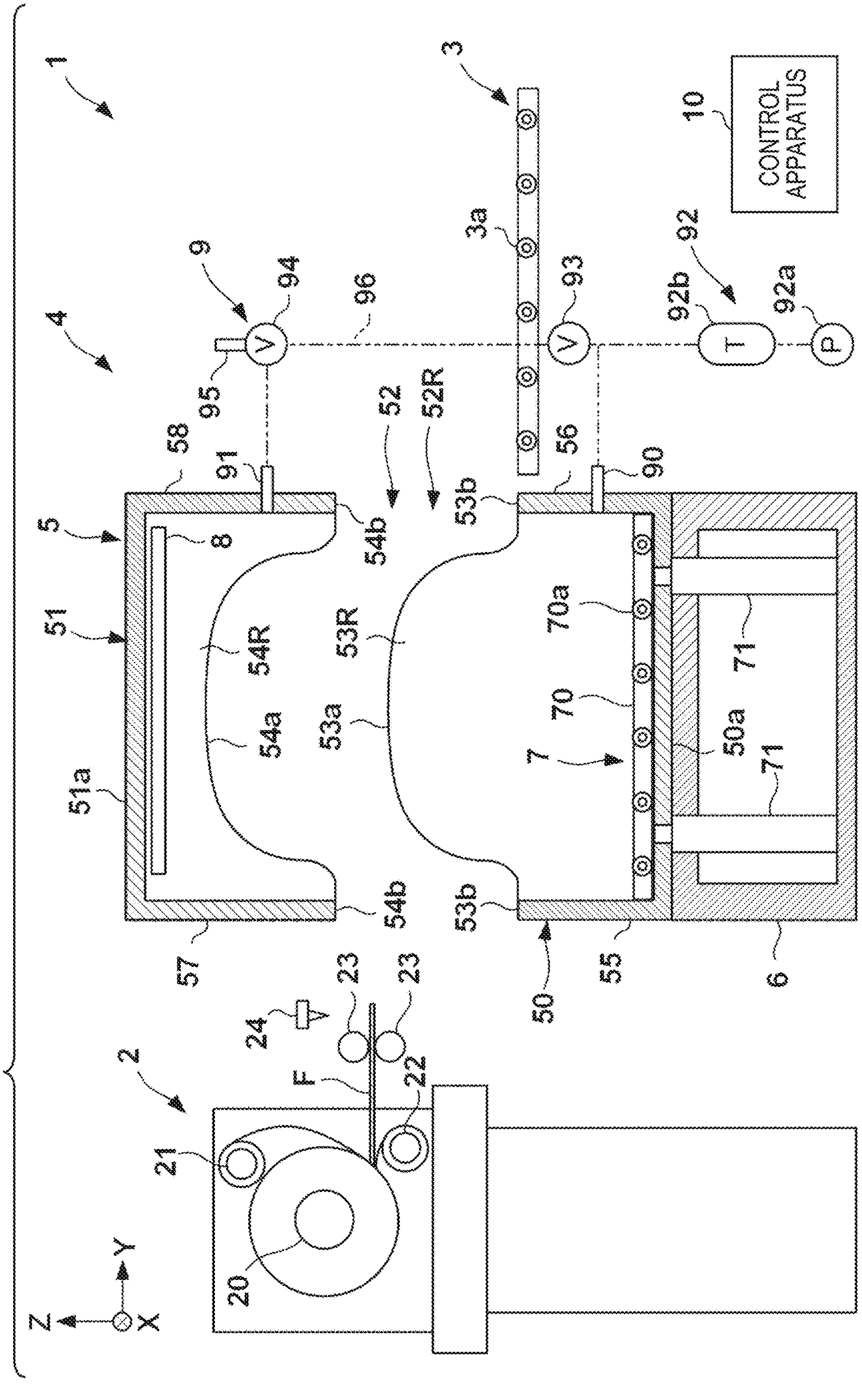
FIG. 1 is a schematic diagram of a coating system.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Overview of Coating System>

Figure 2:
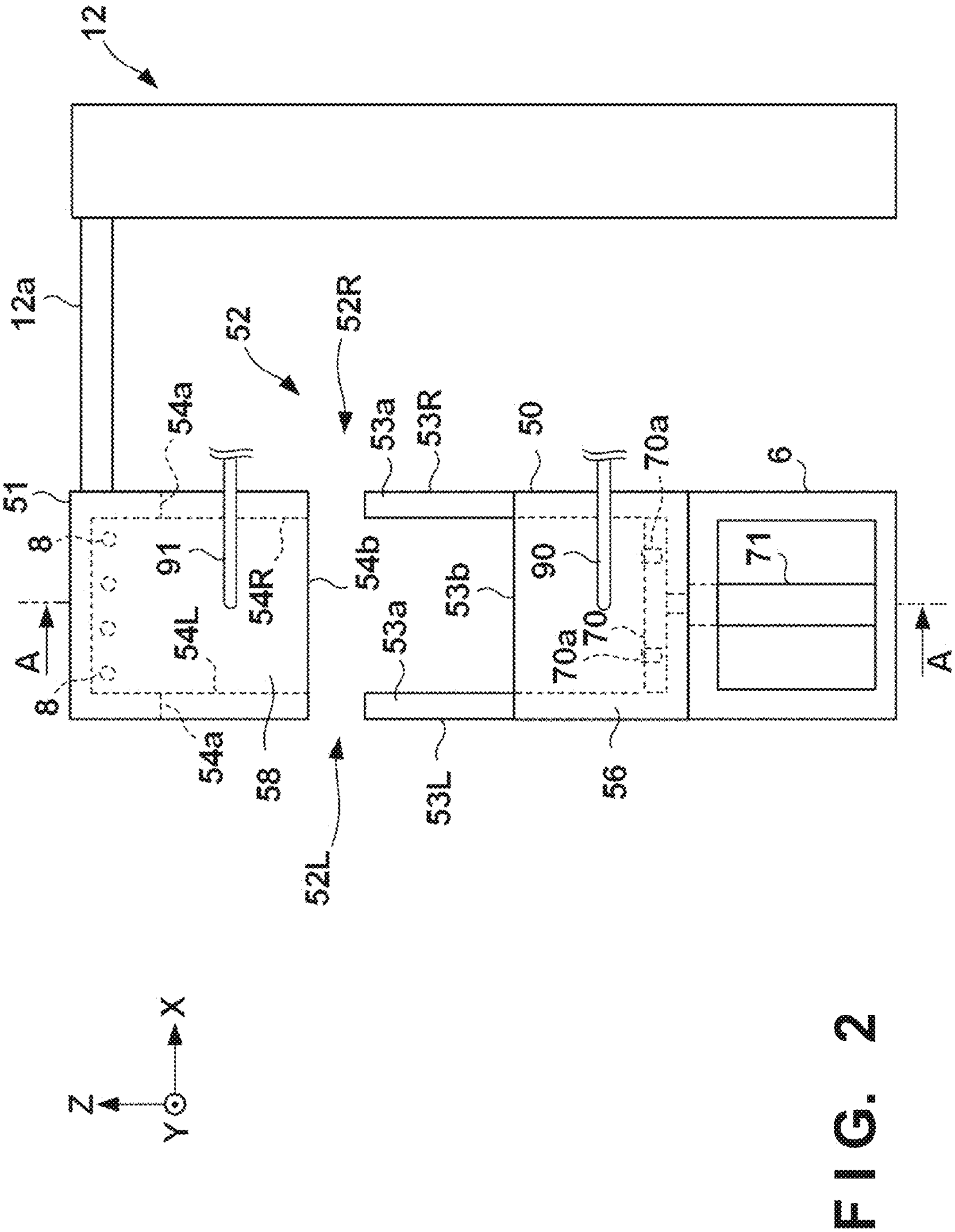
FIG. 2 is an external view of a coating apparatus that composes the coating system of FIG. 1.

FIG. 1 is a schematic diagram of a coating system 1 that includes a coating apparatus 4 according to one embodiment of the present invention, and FIG. 2 is an external view of the coating apparatus 4. In each figure, arrows X and Y indicate horizontal directions that intersect with each other; in the present embodiment, these directions are perpendicular to each other. An arrow Z indicates an up-down direction. FIG. 2 is an external view of the coating apparatus 4 as viewed in the Y direction, and the coating apparatus 4 of FIG. 1 is equivalent to a cross-sectional view taken along the line A-A of FIG. 2.

The coating system 1 is a decoration system in which a work to be coated is decorated by being coated with a film, and includes a film supply apparatus 2, a conveyance apparatus 3, and the coating apparatus 4. The film supply apparatus 2 is an apparatus that supplies a film F to the coating apparatus 4. The film F is a film that uses, for example, an extensible material, specifically thermoplastic resin; for example, the film F has a multilayer structure whereby the film F includes a decorative layer with colors and patterns for decorating the work to be coated as a surface layer, and includes an adhesive layer as a lowermost layer.

In the case of the present embodiment, the film F is in the form of a belt-like sheet, and is wound as a roll around a shaft 20 that is supported so as to be rotatable around the X axis. The front and back surfaces of the film F are each coated with a protection sheet; when the film F is supplied to the coating apparatus 4, take-up rollers 21 and 22 strip off the protection sheets on the front and back surfaces. The film supply apparatus 2 also includes a pair of guide rollers 23 that feeds the film F horizontally in the Y direction, and a cutter 24 that cuts the film F.

The conveyance apparatus 3 carries in and carries out the work to be coated to and from the coating apparatus 4. In the case of the present embodiment, the conveyance apparatus 3 is a roller conveyer that includes a plurality of rollers 3*a*, and conveys the work to be coated in the Y direction. The conveyance apparatus 3 may be various types of conveyers other than the roller conveyer, such as a belt conveyer, or may be a multi-joint robot.

The coating apparatus 4 is an apparatus that coats the work to be coated with the film F by making the film F tightly adhere to the work to be coated; as one example, the coating apparatus 4 of the present embodiment is a vacuum-forming coating apparatus that improves adhesiveness of the film F to the work to be coated by making use of the difference in atmospheric pressure.

The coating apparatus 4 includes a chamber 5 which is mounted on a base unit 6 and which forms an airtight internal space. The chamber 5 includes a lower space forming member 50 and an upper space forming member 51, and has a shape of a box that has been vertically divided into halves. The lower space forming member 50 has a shape of a cuboid box with an open top, and includes a bottom wall portion 50*a*, wall portions 55 and 56 at both ends in the Y direction, and left and right wall portions 53R and 53L (at both ends in the X direction). The upper space forming member 51 has a shape of a cuboid box with an open bottom, and includes a top wall portion 51*a*, wall portions 57 and 58 at both ends in the Y direction, and left and right wall portions 54R and 54L (at both ends in the X direction).

The coating apparatus 4 includes an elevator apparatus 12 provided with an arm portion 12*a* that is raised or lowered in the Z direction, and the upper space forming member 51 is joined to the arm portion 12*a*. The elevator apparatus 12 includes, for example, an elevator mechanism that raises or lowers the arm portion 12*a* while using a motor as a driving source; the elevator mechanism is, for example, a ball screw mechanism. The elevator apparatus 12 raises or lowers the upper space forming member 51 relative to the lower space forming member 50. When the upper space forming member 51 has been lowered, the upper space forming member 51 and the lower space forming member 50 are vertically combined, and the chamber 5 forms an airtight internal space (closed state). When the upper space forming member 51 has been raised, the internal space of the chamber 5 is released (open state). FIG. 1 and FIG. 2 both show a form of the coating apparatus 4 when the upper space forming member 51 has been raised (open state).

The coating apparatus 4 includes heating units 8 that heat the film F in the internal space of the chamber 5. The heating units 8 are, for example, heat generation elements that generate heat using electric power that has been supplied thereto. The heat of the heating units 8 softens the film F, thereby improving the degree of adhesiveness of the film F to the work to be coated. In the case of the present embodiment, the heating units 8 are arranged inside the upper space forming member 51.

The coating apparatus 4 includes an elevator apparatus 7 that raises or lowers the work to be coated in the internal space of the chamber 5. The elevator apparatus 7 includes a table 70 on which the work to be coated is placed, and a plurality of actuators 71. The table 70 has a conveyance function of conveying the work to be coated in the Y direction due to rotation of rollers 70*a*, and is arranged inside the lower space forming member 50. Th actuators 71 are fluid cylinders or electric cylinders; their bodies are embedded in the base unit 6, while their rod portions penetrate through the bottom wall 50*a* of the lower space forming member 50 and are connected to the table 70. FIG. 1 and FIG. 2 both show a form of the coating apparatus 4 when the table 70 has been lowered.

The coating apparatus 4 includes an atmospheric pressure adjustment apparatus 9 that adjusts the atmospheric pressure in the internal space of the chamber 5. The atmospheric pressure adjustment apparatus 9 includes a pipe 90 communicated with the inside of the lower space forming member 50, a pipe 91 communicated with the inside of the upper space forming member 51, a depressurizing unit 92, and valves 93 and 94. In the case of the present embodiment, the depressurizing unit 92 includes a pump 92*a* and a depressurizing tank 92*b*, and the depressurizing tank 92*b* is constantly depressurized by the pump 92*a*. The depressurizing unit 92 may be composed only of the pump 92*a*. When the depressurizing tank 92*b* is provided, the inside of the chamber 5 can be depressurized in a relatively short period of time by the depressurizing tank 92*b* with use of the relatively low-power pump 92*a*. The pipe 90 communicates with the depressurizing tank 92*b*, and the pipe 91 communicates with the depressurizing tank 92*b* via the valve 93, a pipe 96, and the valve 94.

The valve 93 switches the state of communication between the pipe 96 and the depressurizing tank 92*b*. The valve 94 switches the state of communication between the pipe 91 and the pipes 95 and 96. The pipe 95 is open to the atmosphere. The valve 94 can switch between a state where the pipe 91 communicates only with the pipe 95 and a state where the pipe 91 communicates only with the pipe 96.

The chamber 5 composes a support structure 52 that supports the film F over the work to be coated. The support structure 52 includes a right support structure 52R and a left support structure 52L that are arranged with a distance therebetween in the X direction. The right support structure 52R includes a lower member formed by the wall portion 53R and an upper member formed by the wall portion 54R; the wall portion 53R may be referred to as the lower member 53R, and the wall portion 54R may be referred to as the upper member 54R. The left support structure 52L includes a lower member formed by the wall portion 53L and an upper member formed by the wall portion 54L; the wall portion 53L may be referred to as the lower member 53L, and the wall portion 54L may be referred to as the upper member 54L.

The right support structure 52R and the left support structure 52L compose a clamping structure in which they vertically hold the film F therebetween. The lower member 53R of the right support structure 52R includes a support surface 53*a* that supports the film F from below. The support surface 53*a* is not flat, but extends in the Y direction while curving in the Z direction. In the present embodiment, the support surface 53*a* has an inverted U shape. The curved profile of the support surface 53*a* is designed to extend along an outline of the work to be coated. The upper member 54R of the right support structure 52R includes a contact surface 54*a* that comes into contact with the film F from above. The contact surface 54*a* extends in the Y direction while curving in the Z direction along the support surface 53*a*. In the present embodiment, the contact surface 54*a* has a U shape corresponding to the support surface 53*a*. The support surface 53*a* and the contact surface 54*a* are formed to perfectly fit with each other with the film F therebetween when the upper space forming member 51 has been lowered, thereby maintaining the airtightness inside the chamber 5. In the case of the present embodiment, the forms of the lower member 53L and the upper member 54L of the left support structure 52L are similar to the forms of the lower member 53R and the upper member 54R.

The wall portions 55 and 56 of the lower space forming member 50 and the wall portions 57 and 58 of the upper space forming member 51 also compose a clamping structure in which they vertically hold the film F therebetween. Top surfaces of the wall portions 55 and 56 each have a support surface 53*b* that supports the film F from below, and bottom surfaces of the wall portions 57 and 58 each have a contact surface 54*b* that comes into contact with the film F from above. In the present embodiment, each of the support surfaces 53*b* and the contact surfaces 54*b* is a flat surface. The support surface 53*b* and the corresponding contact surface 54*b* are formed to perfectly fit with each other with the film F therebetween when the upper space forming member 51 has been lowered, thereby maintaining the airtightness inside the chamber 5.

A control apparatus 10 is an electronic circuit that controls the entirety of the coating system 1. The control apparatus 10 includes, for example, a processing unit, a storage unit, an input/output interface (I/O), a display unit, and an input unit. The processing unit is a processor, which is typically a CPU, and controls the coating system 1 by executing a program stored in the storage unit. The storage unit is a storage device such as a ROM, a RAM, and an HDD, and stores various types of control information in addition to the program executed by the processing unit. The input/output interface is an interface that exchanges signals between the processing unit and external devices (an actuator such as a motor, and a sensor). The display unit is a display that displays information for a user. The input unit is a key switch that is intended for the user to input instructions. The display unit and the input unit may be composed of a touch panel.

<Exemplary Operations>

Figure 3:
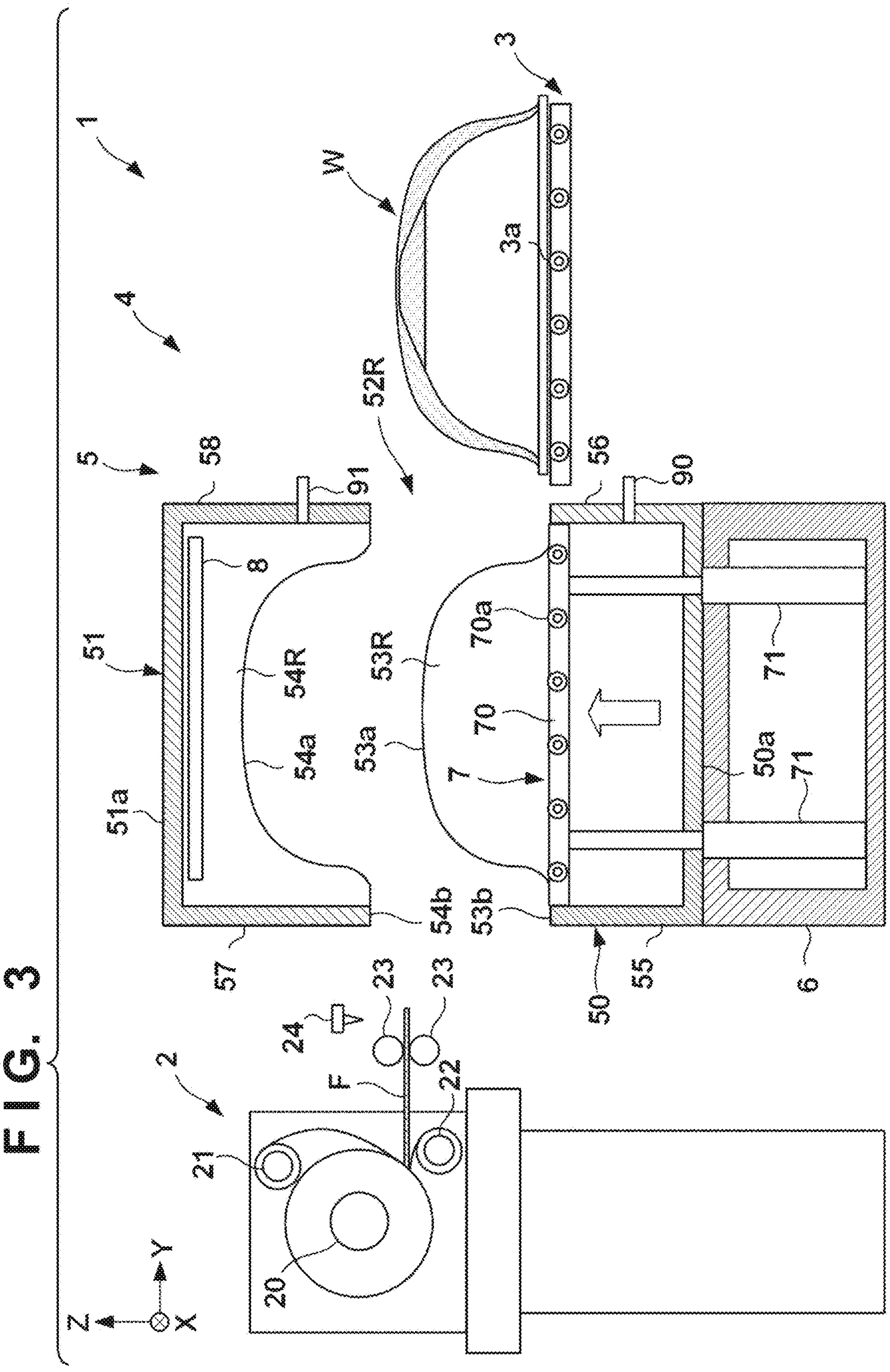
FIG. 3 is a diagram illustrating the operations of the coating system of FIG. 1.
Figure 4:
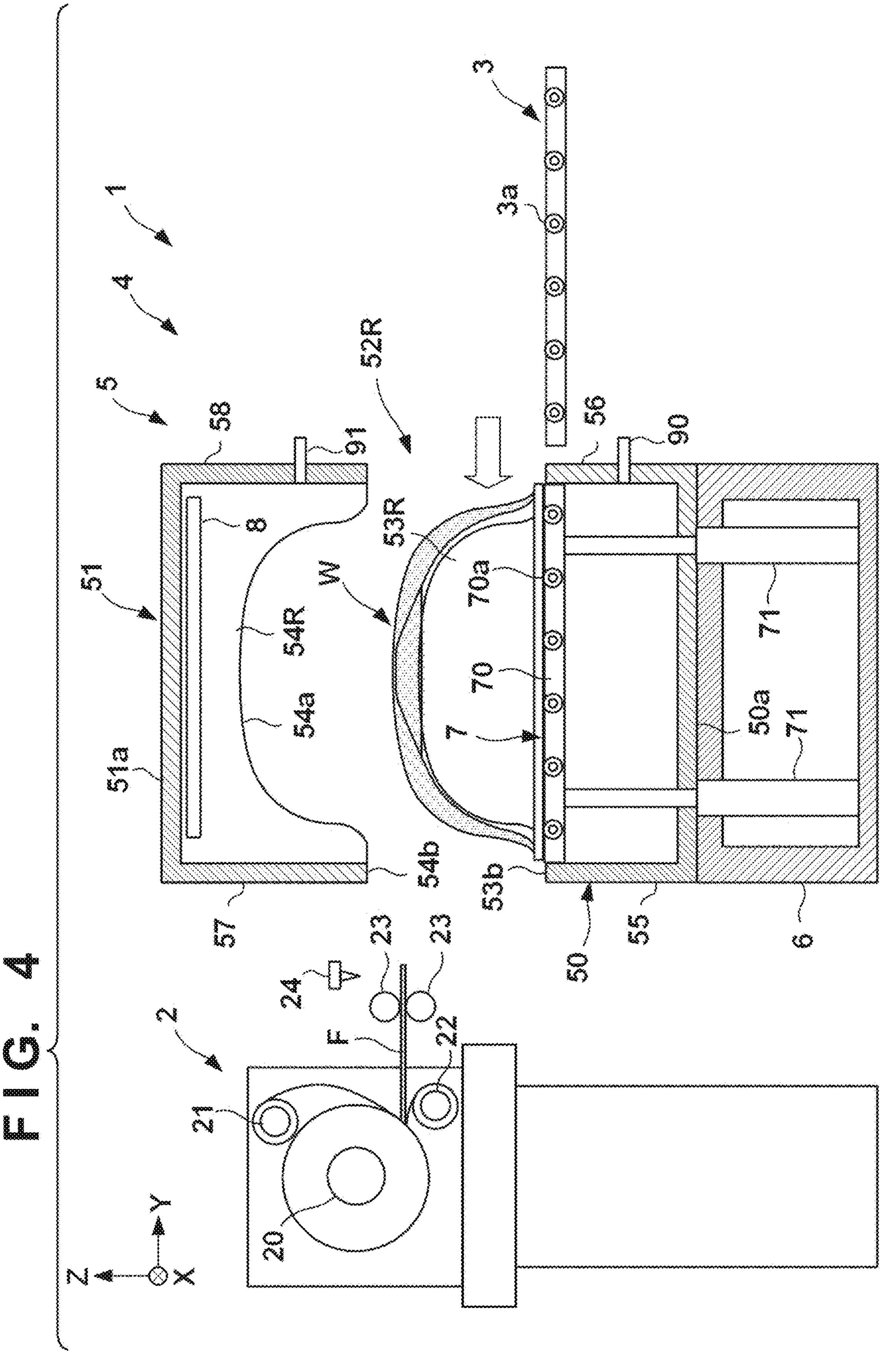
FIG. 4 is a diagram illustrating the operations of the coating system of FIG. 1.

Exemplary operations of the coating system 1 will be described with reference to FIG. 3 to FIG. 11. In the case of the present embodiment, the operations of the coating system 1 are basically automated by the control apparatus 10, and a part of processes is a manual task performed by a worker. FIG. 3 and FIG. 4 show a process of carrying a work to be coated W into the coating apparatus 4. The work to be coated W is attached to a jig, and placed on the conveyance apparatus 3 with its surface to be coated facing up. In the example shown, the work to be coated W is assumed to be a front bumper of an automobile. The front bumper is carried into the coating apparatus 4 in such a manner that the Y direction and the Z direction respectively correspond to the width direction (the left-right direction) of the car and the front-rear direction of the vehicle at the time of installation on the vehicle. As shown in FIG. 3, an outline of the work to be coated W has an inverted U shape, and the support surfaces 53*a* and the contact surfaces 54*a* are curved in the up-down direction along the outline of the work to be coated W.

In the state of FIG. 3, the chamber 5 is in the open state, and the table 70 has been raised to a position that is flush with a conveyance surface of the conveyance apparatus 3. When the rollers 3*a* of the conveyance apparatus 3 and the rollers 70*a* of the table 70 have been driven, the work to be coated W is transported from the conveyance apparatus 3 onto the table 70 as shown in FIG. 4.

Figure 5:
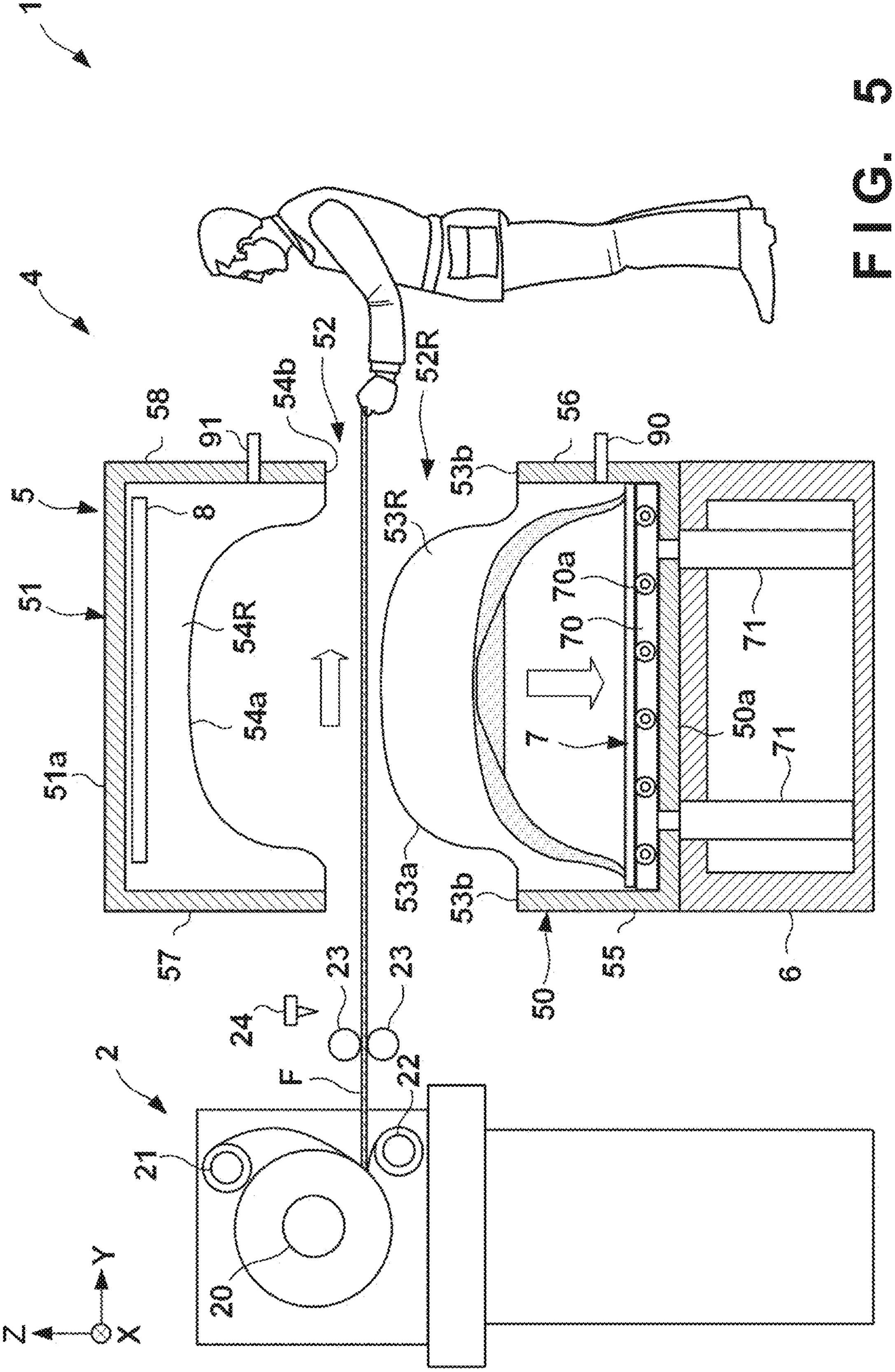
FIG. 5 is a diagram illustrating the operations of the coating system of FIG. 1.

Next, the table 70 is lowered, thereby causing the work to be coated W to be housed inside the lower space forming member 50. The work to be coated W is positioned between the lower member 53R and the lower member 53L in the X direction. The film F is conveyed from the film supply apparatus 2 to above the work to be coated W. FIG. 5 shows one example of this. In the example shown, a worker manually pulls out the film F from the film supply apparatus 2 in the Y direction, and conveys the film F to above the work to be coated W.

Figure 6:
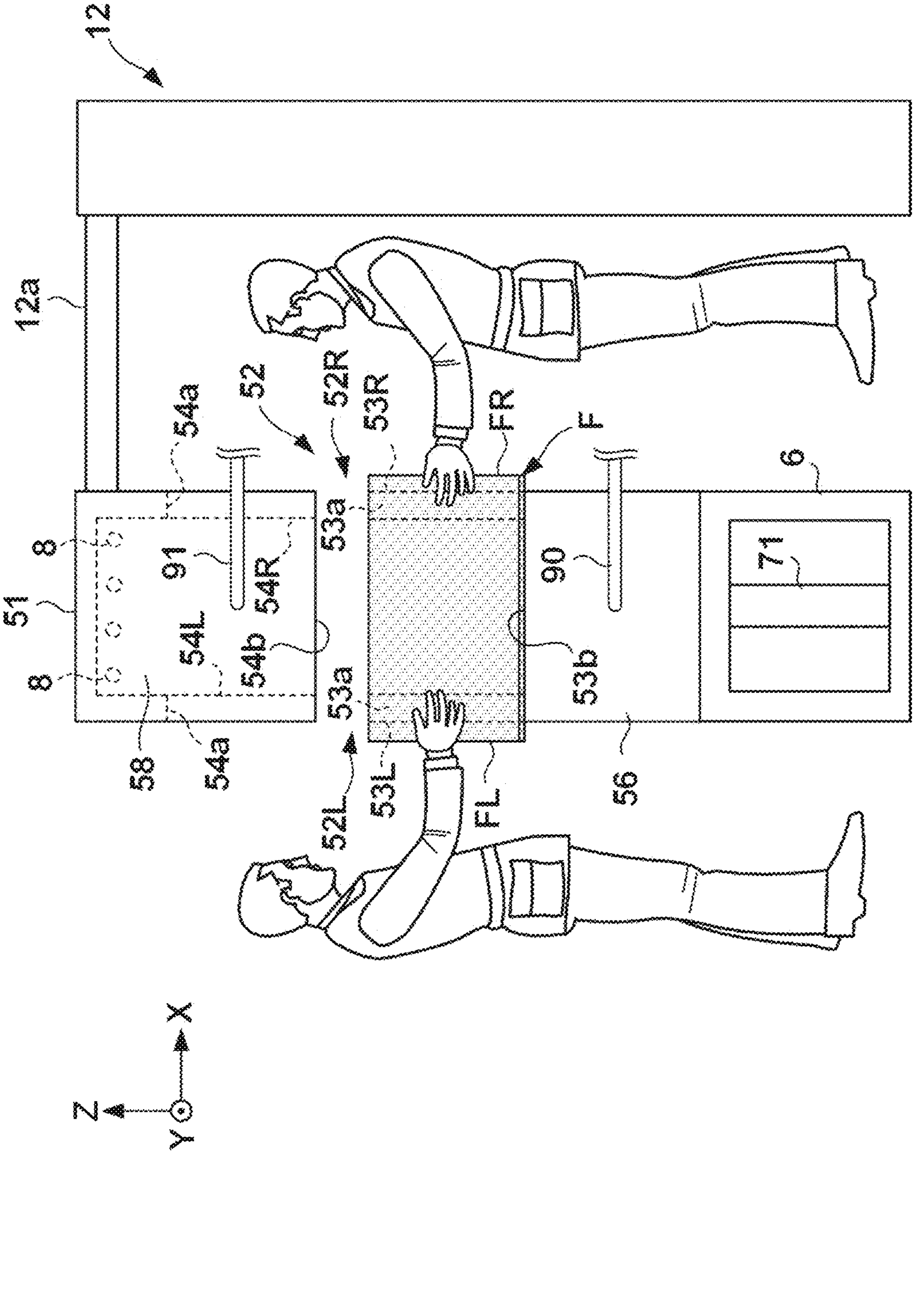
Figure 7:
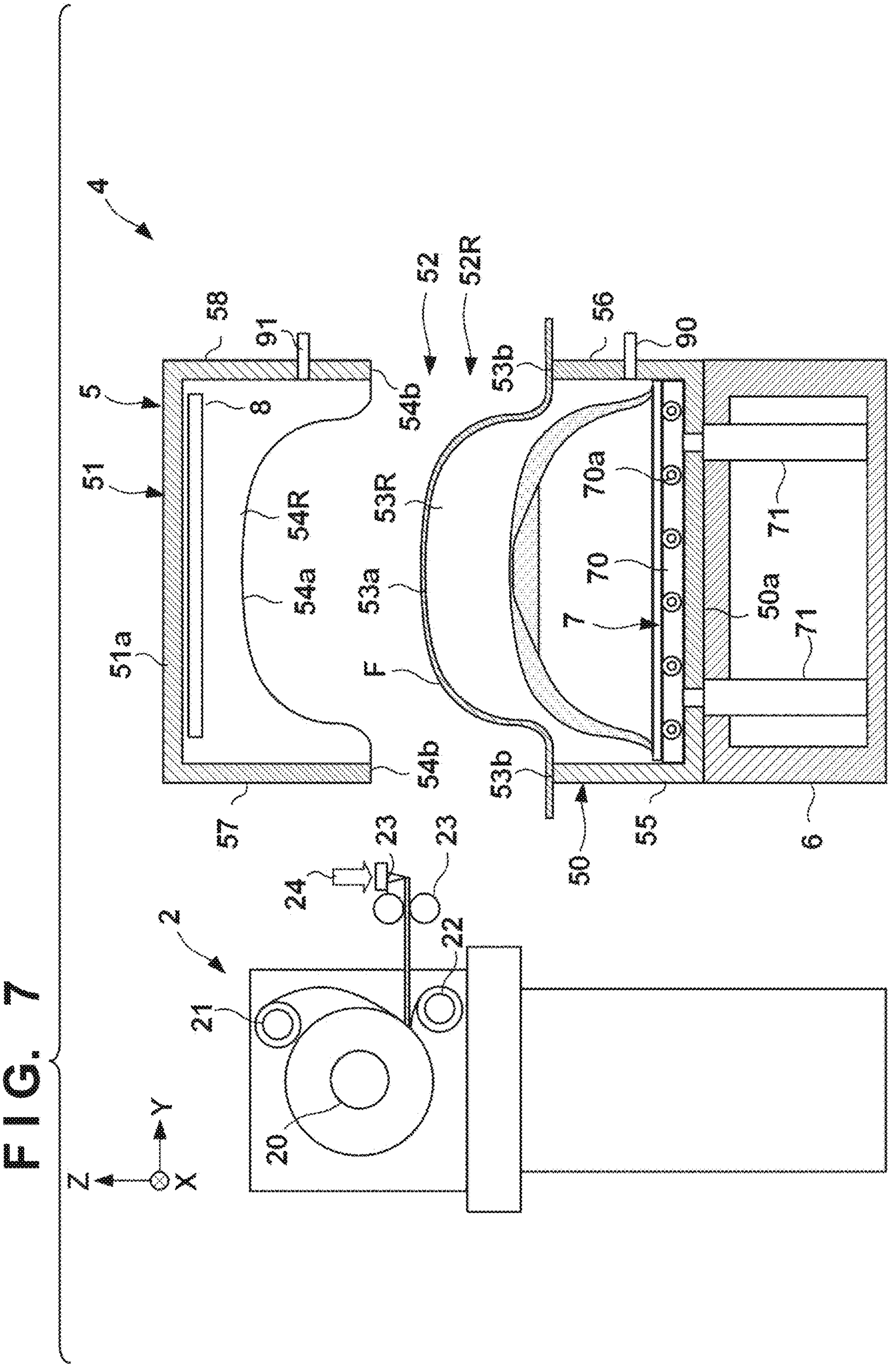
FIG. 7 is a diagram illustrating the operations of the coating system of FIG. 1.

Once the film F has been conveyed to above the work to be coated W, a transition is made to a process of setting the film F on the support surfaces 53*a*. FIG. 6 shows one example of this. In the example shown, workers manually place the film F on the left and right support surfaces 53*a*. At this time, the workers causes the film F to adhere to the support surfaces 53*a* by making use of the adhesive layer of the film F while pulling the film F in the X direction so as to prevent the occurrence of wrinkles in the film F. One end FR of the film F in the X direction adheres to the support surface 53*a* of the lower member 53R while partially sticking out toward the outside, whereas the opposite end FL thereof adheres to the support surface 53*a* of the lower member 53L while partially sticking out toward to the outside. Furthermore, one end of the film F in the Y direction adheres to the support surface 53*b* of the wall portion 56, whereas the other end thereof adheres to the support surface 53*b* of the wall portion 55. As shown in FIG. 7, the film F is cut by the cutter 24, and is placed in a state where it seals the top of the lower space forming member 50.

Figure 8B:
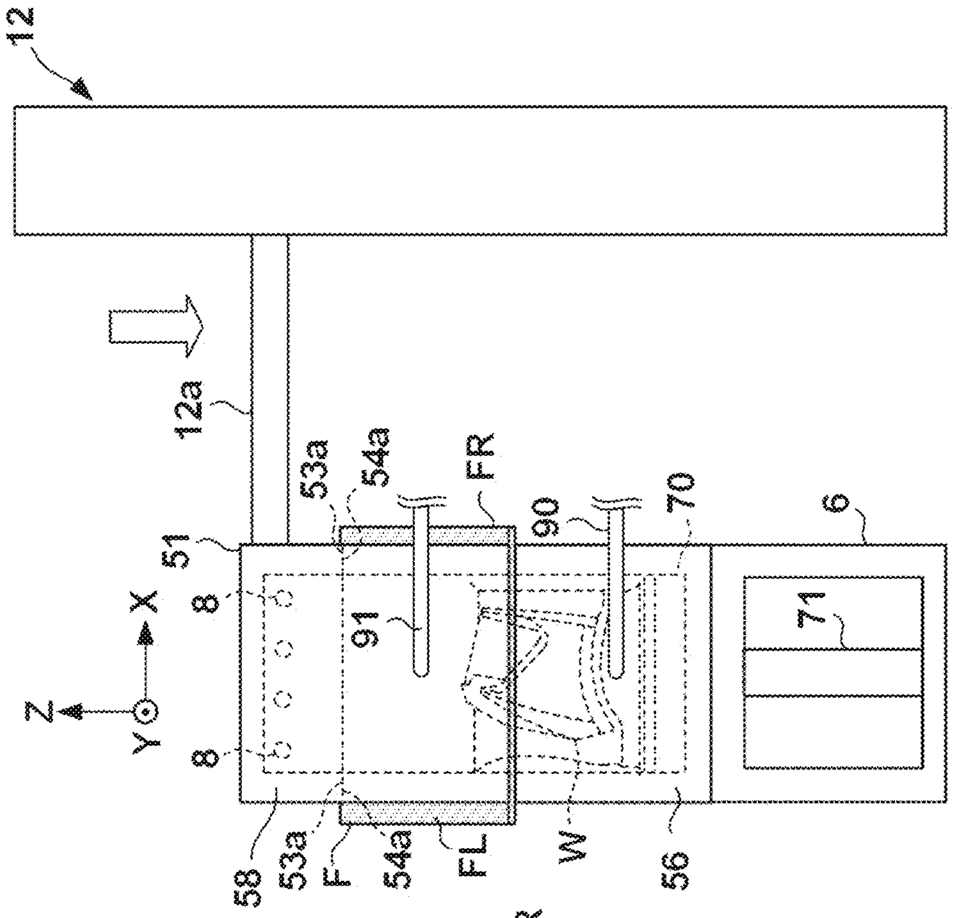
FIG. 8A and FIG. 8B are diagrams illustrating the operations of the coating system of FIG. 1.
Figure 8A:
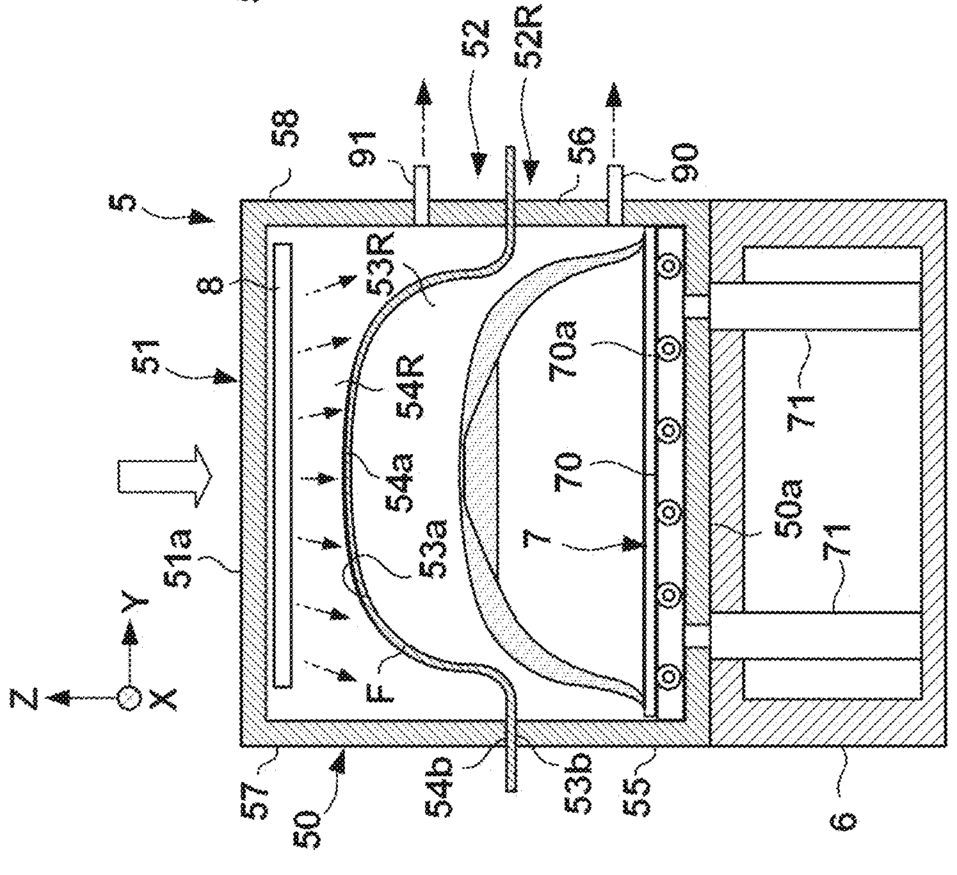

Next, as shown in FIG. 8A and FIG. 8B, the upper space forming member 51 is lowered by driving the elevator apparatus 12, thereby placing the chamber 5 in the closed state. The ends FR and FL of the film F in the X direction are sandwiched between the left and right support surfaces 53*a* and contact surfaces 54*a*. Furthermore, the ends of the film F in the Y direction are also sandwiched between the support surfaces 53*b* and the contact surfaces 54*b*. The film F also functions as a seal between the lower space forming member 50 and the upper space forming member 51, thereby causing the space inside the chamber 5 to be airtight. The internal space of the chamber 5 is vertically partitioned by the film F into an upper space whose border is defined by the upper space forming member 51 and the film F, and a lower space whose border is defined by the lower space forming member 50 and the film F. The work to be coated W is located in the lower space, and the film F is arranged above the work to be coated W.

After the chamber 5 has been placed in the closed state, the atmospheric pressure adjustment apparatus 9 depressurizes the internal space of the chamber 5. Here, the valve 94 is switched to the state where the pipe 91 and the pipe 96 are communicated with each other, and then the valve 93 is switched to the state where the pipe 96 and the depressurizing tank 92*b* are communicated with each other. The air in the internal space of the chamber 5 is discharged from the pipes 90 and 91, and the upper space and the lower space are both depressurized. Furthermore, after the chamber 5 has been placed in the closed state, the film F is heated by causing the heating units 8 to generate heat. This results in a state where the film F is softened and easily stretch.

Figure 9B:
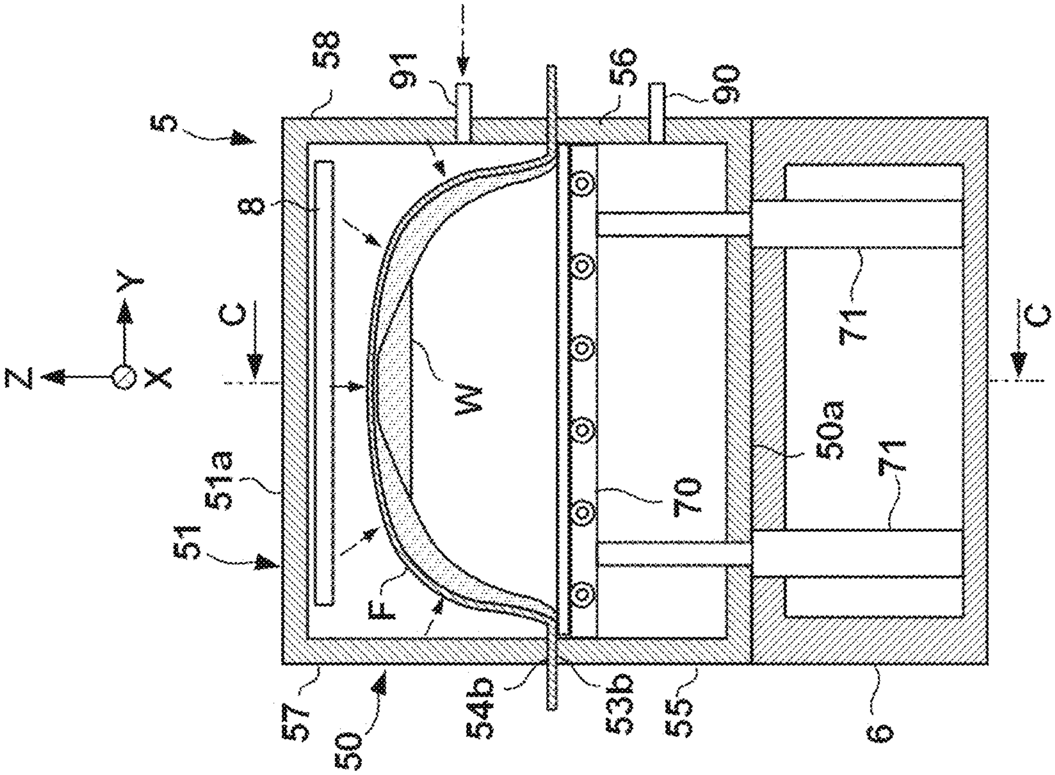
FIG. 9A and FIG. 9B are diagrams illustrating the operations of the coating system of FIG. 1.
Figure 9A:
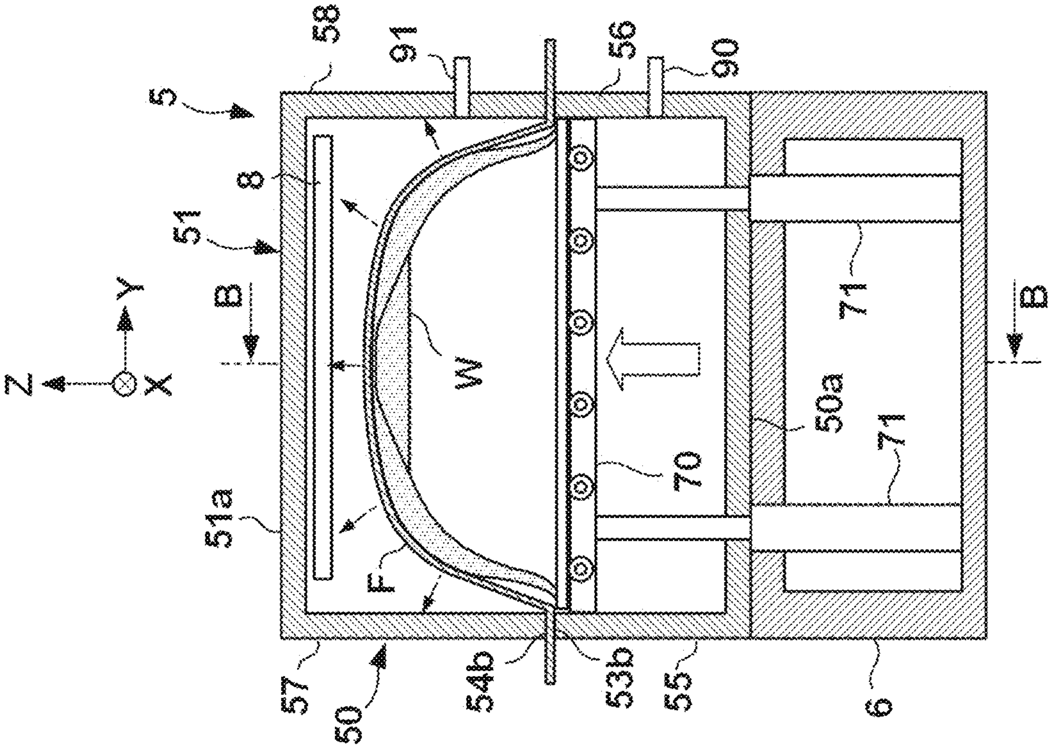
Figure 10B:
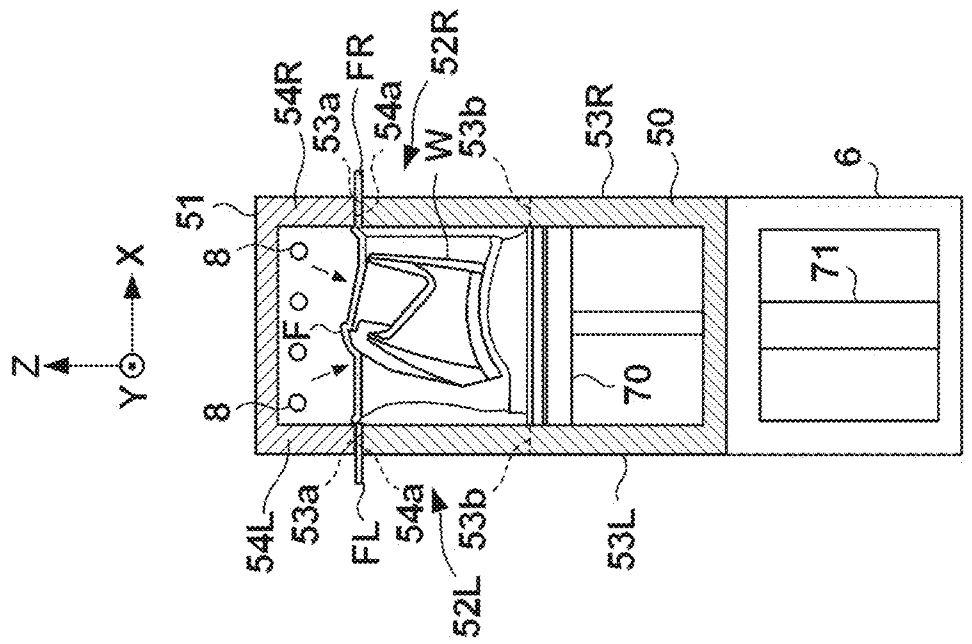
FIG. 10A and FIG. 10B are diagrams illustrating the operations of the coating system of FIG. 1.
Figure 10A:
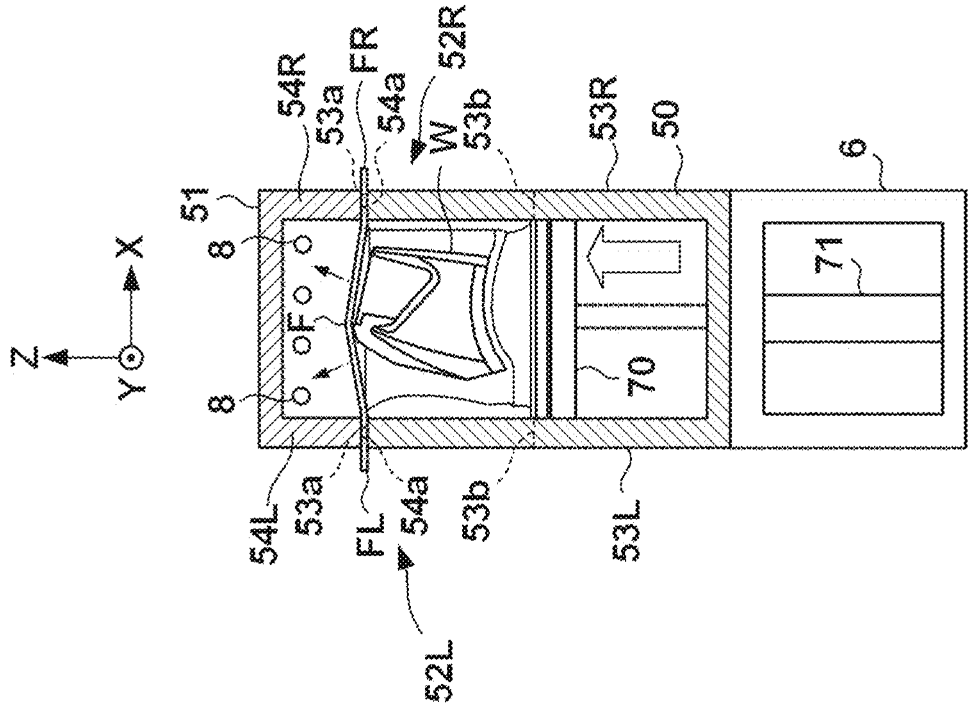

Next, as shown in FIG. 9A and FIG. 10A, the table 70 is raised. FIG. 10A is a cross-sectional view taken along the line B-B of FIG. 9A. The work to be coated W causes the film F to stretch by pushing up the film F. The film F has been supported by the support surfaces 53*a* beforehand so as to be in the inverted U shape when viewed in the X direction, and is pushed up by the work to be coated W in a state where it resembles the shape of the outline of the work to be coated W. Compared to a case where the work to be coated W is pushed up in a state where the film F is stretched into a flat state, the present embodiment suppresses differences in the amount by which the film F is stretched in different areas of the work to be coated W, and causes the film F to be evenly stretched as a whole.

Next, the valve 94 is switched to the state where the pipe 91 and the pipe 95 are communicated with each other. Out of the internal space of the chamber 5, the upper space above the film F becomes open to the atmosphere via the pipe 91, and the difference in atmospheric pressure arises between the upper space and the lower space. As shown in FIG. 9B and FIG. 10B, the film F is suctioned toward the lower space due to the difference in atmospheric pressure. FIG. 10B is a cross-sectional view taken along the line C-C of FIG. 9B. The degree of adhesiveness of the film F to the work to be coated W increases, and the stretched film F tightly fits and adheres to fine recesses and projections of the work to be coated W. The work to be coated W is coated with the film F. As stated earlier, as the present embodiment suppresses differences in the amount by which the film F is stretched in different areas of the work to be coated W, it also suppresses variations in the amount by which the film F is stretched in different areas at the time of this adhesion.

Note that it is permissible to adopt a configuration in which a constituent that pressurizes the upper space above the film F is further included, and the pressurization of the upper space increases the difference in atmospheric pressure between the upper space and the lower space when the work to be coated W is coated with the film F.

Figure 11:
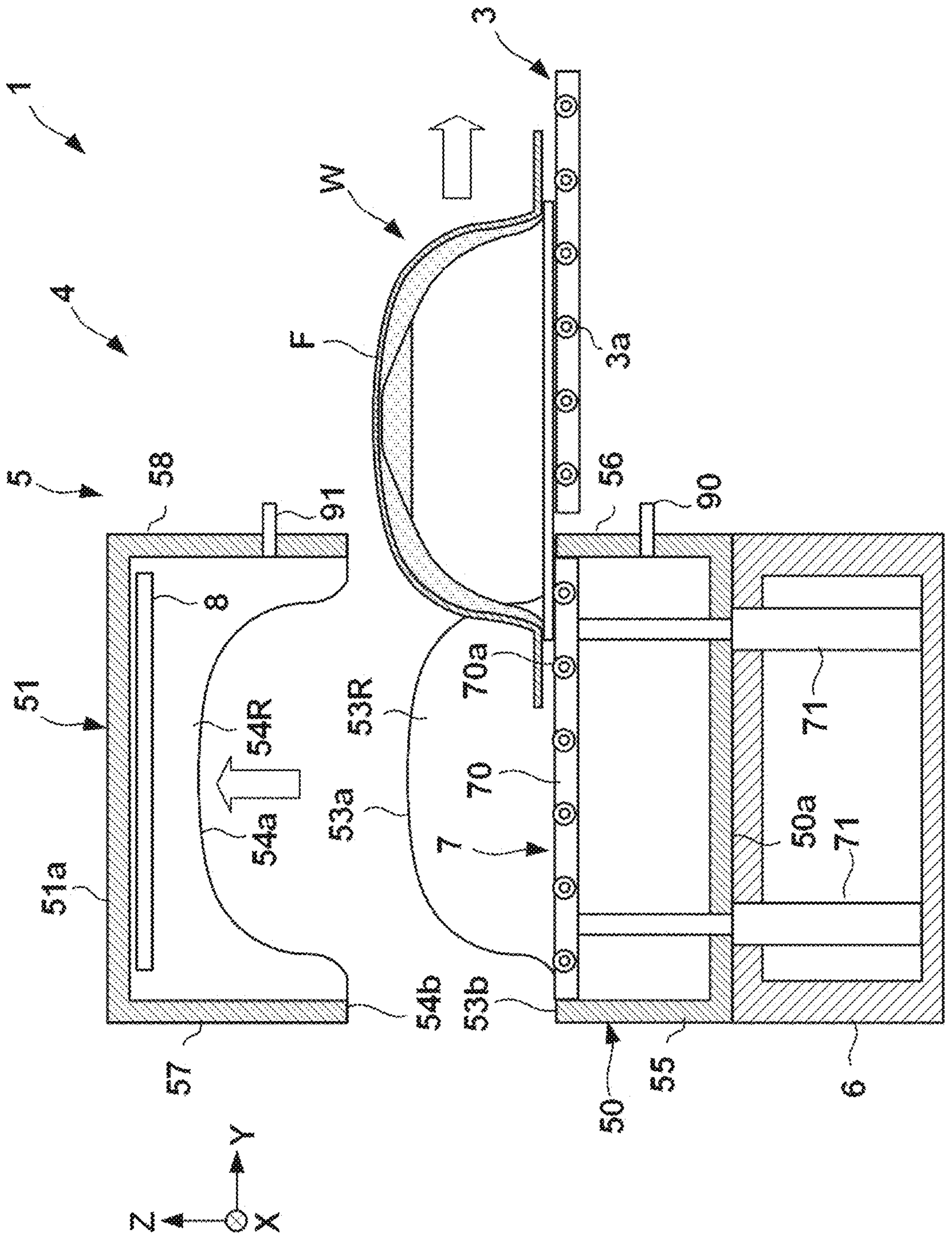
FIG. 11 is a diagram illustrating the operations of the coating system of FIG. 1.

Next, a transition is made to a process of carrying out the work to be coated W after it has been coated with the film F. The valve 93 is closed to bring the pipe 90 into communication with the pipe 95, and cause the lower space of the chamber 5 to be open to the atmosphere as well. As shown in FIG. 11, the upper space forming member 51 is raised by driving the elevator apparatus 12, thereby placing the chamber 5 in the open state. The table 70 is adjusted in height so that it becomes flush with the conveyance apparatus 3, and then the work to be coated W is carried out from the coating apparatus 4 to the conveyance apparatus 3 by driving the rollers 70*a* and 3*a*. This concludes a coating task. Thereafter, excess portions of the film F coating the work to be coated W are trimmed as necessary.

As described above, in the present embodiment, the support surfaces 53*a* have a curved shape, thereby suppressing differences in the amount by which the film F is stretched in different areas of the work to be coated W. As a result, the occurrence of wrinkles can be prevented.

Second Embodiment

Figure 12:
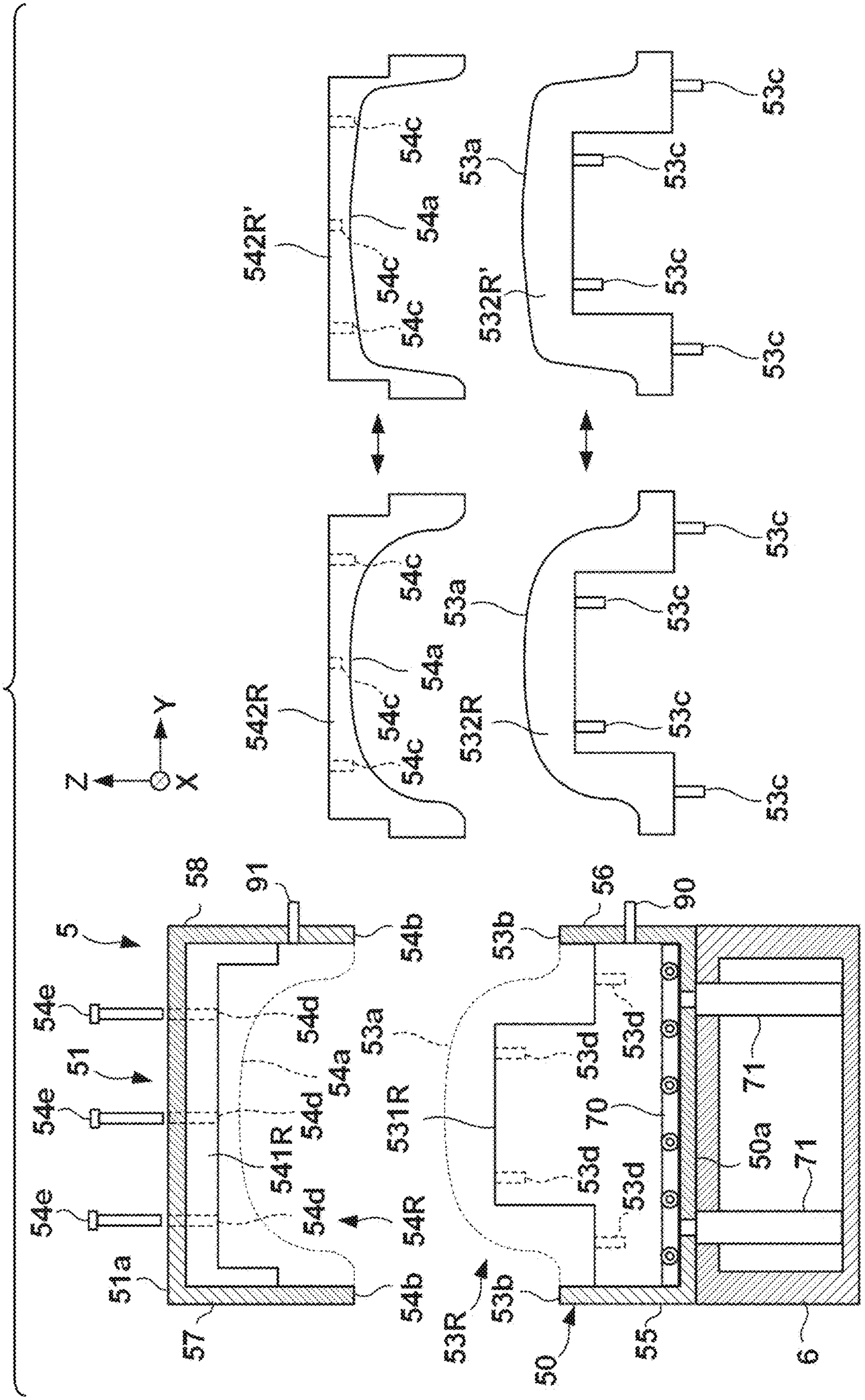
FIG. 12 is a diagram illustrating another exemplary configuration of an upper member and a lower member.

It is permissible to adopt a structure in which the profiles of the support surfaces 53*a* are changeable in accordance with a type of a work to be coated. FIG. 12 is a diagram showing an example thereof, and shows exemplary configurations of the lower member 53R and the upper member 54R. Although the lower member 53R and the upper member 54R are described here, the same goes for the lower member 53L and the upper member 54L.

In the example of FIG. 12, the lower member 53R includes a body portion 531R and an interchangeable portion 532R. The body portion 531R is formed integrally with the lower space forming member 50, and the interchangeable portion 532R is structured to be attachable to and detachable from the body portion 531R. As one example, the structure of FIG. 12 is a structure in which a plurality of pins 53*c* provided in the interchangeable portion 532R fit in a plurality of holes 53*d* provided in the body portion 531R. Note that the pins 53*c* may be provided in the body portion 531R and the holes 53*d* may be provided in the interchangeable portion 532R; such an engagement structure may be a structure other than the structure incorporating pins and holes (e.g., a fastening structure incorporating bolts). A sealing material that improves the airtightness of the internal space of the chamber 5 may be provided between the interchangeable portion 532R and the body portion 531R.

A support surface 53*a* is formed in the interchangeable portion 532R. An interchangeable portion 532R' can be used in place of the interchangeable portion 532R. A support surface 53*a*' that is different from the support surface 53*a* in the profile of the curve is formed in the interchangeable portion 532R'; the remaining portions of the interchangeable portion 532R' are configured similarly to the interchangeable portion 532R. In accordance with a type (shape) of a work to be coated, the interchangeable portion 532R or the interchangeable portion 532R' can be selectively used while sharing the body portion 531R; this makes it possible to easily obtain a support surface 53*a* appropriate for the outline of the work to be coated.

Similarly, the upper member 54R also includes a body portion 541R and an interchangeable portion 542R. The body portion 541R is formed integrally with the upper space forming member 51, and the interchangeable portion 542R is structured to be attachable to and detachable from the body portion 541R. As one example, the structure of FIG. 12 is a structure in which a plurality of screw holes 54*c* are formed in the interchangeable portion 542R, through-holes 54*d* are formed in the body portion 541R, and bolts 54*e* are screwed into and engaged with the screw holes 54*c* via the through-holes 54*d*. Note that although the example of FIG. 12 is the structure in which the body portion 541R and the interchangeable portion 542R are fastened together in the Z direction using the bolts 54*e*, it is permissible to adopt a structure in which the fastening direction is the Y direction. Furthermore, such an engagement structure may be another structure. A sealing material that improves the airtightness of the internal space of the chamber 5 may be provided between the interchangeable portion 542R and the body portion 541R.

A contact surface 54*a* is formed in the interchangeable portion 542R. An interchangeable portion 542R' can be used in place of the interchangeable portion 542R. A support surface 54*a*' that is different from the contact surface 54*a* in the profile of the curve is formed in the interchangeable portion 542R'; the remaining portions of the interchangeable portion 542R' are configured similarly to the interchangeable portion 542R. The profile of the contact surface 54*a* of the interchangeable portion 542R' corresponds to the support surface 53*a* of the interchangeable portion 532R', and the set of the interchangeable portion 532R' and the interchangeable portion 542R' is exchanged with the interchangeable portion 532R and the interchangeable portion 542R. In accordance with a type (shape) of a work to be coated, the pair of the interchangeable portion 532R and the interchangeable portion 542R or the pair of the interchangeable portion 532R' and the interchangeable portion 542R' can be selectively used while sharing the body portions 531R and 541R; this makes it possible to easily obtain a support surface 53*a* and a contact surface 54*a* appropriate for the outline of the work to be coated.

Third Embodiment

Although a worker manually pulls out a film F from the film supply apparatus 2, conveys the film F to above a work to be coated W, and sets the film F on the support surfaces 53*a* (FIG. 5 and FIG. 6) in the first embodiment, these tasks can also be automated. In this way, all of the operations that have been described with reference to FIG. 3 to FIG. 11 can be automated by the control apparatus 10.

(First Exemplary Configuration)

Figure 13:
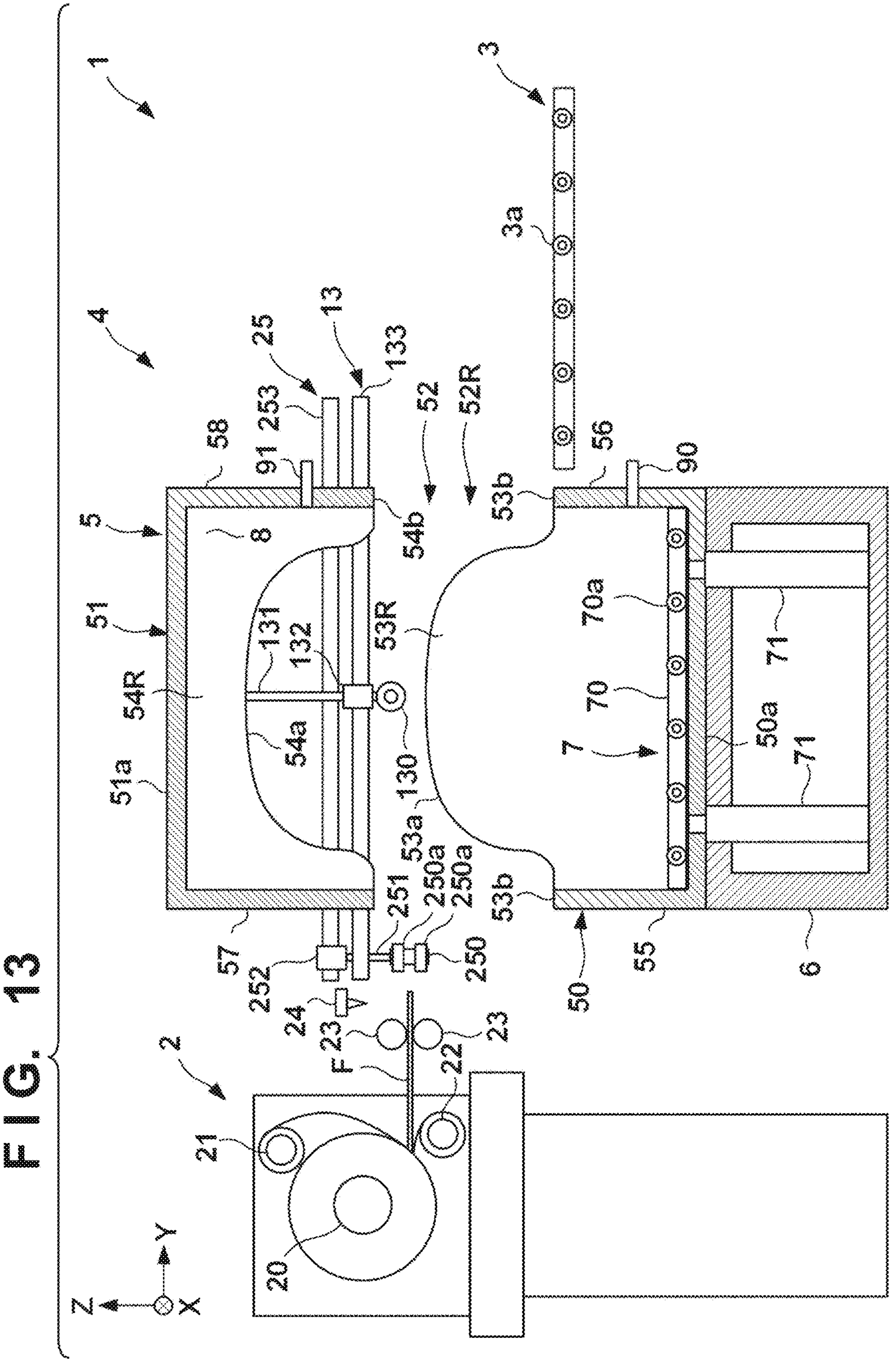
FIG. 13 is a schematic diagram showing an example of a film conveyance mechanism.
Figure 14:
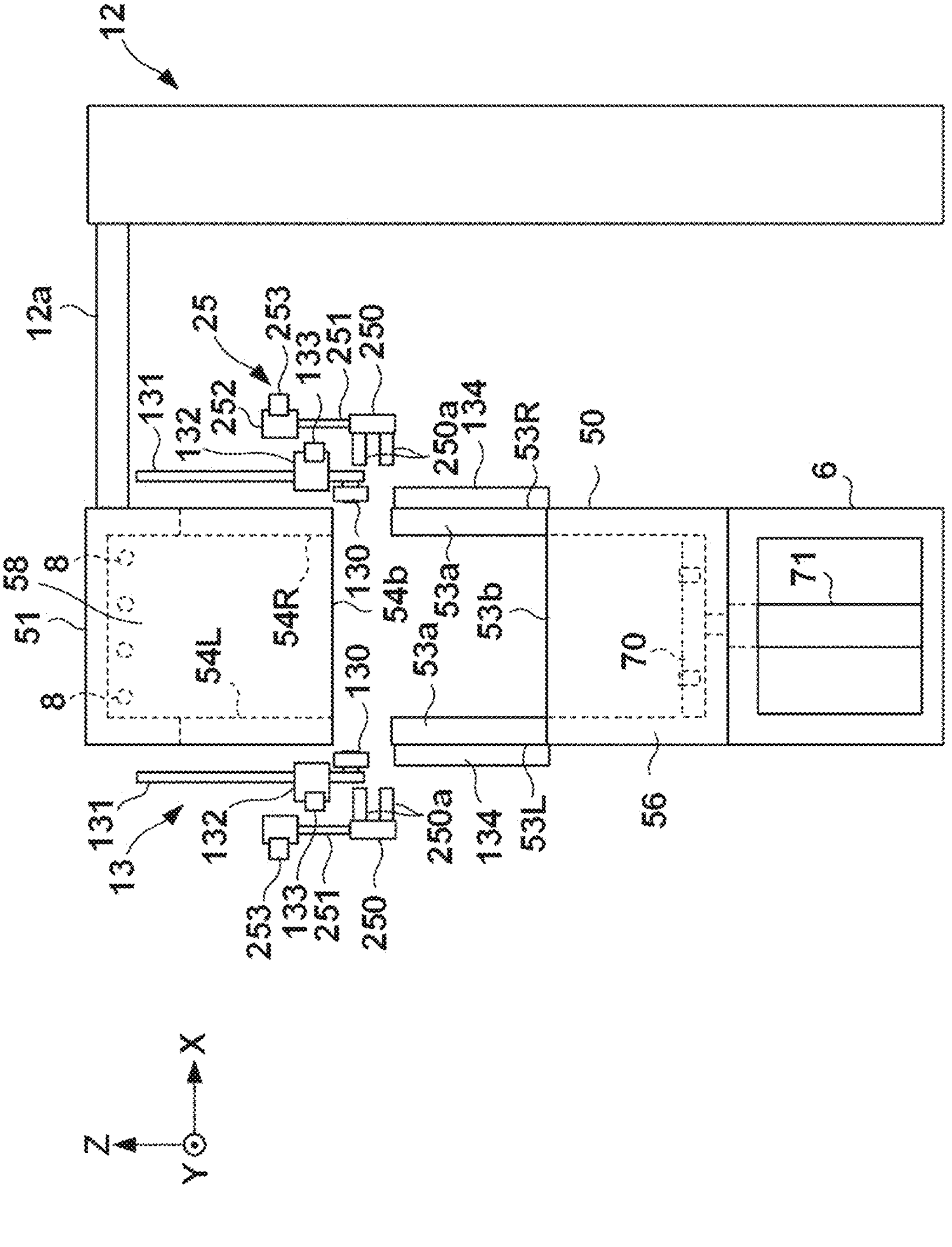
FIG. 14 is an external view of the coating apparatus, and shows an example of the film conveyance mechanism.

FIG. 13 is a schematic diagram of the coating system 1 according to the present embodiment, and FIG. 14 is a diagram of the coating system 1 as viewed in the Y direction (the film supply apparatus 2 and the conveyance apparatus 3 are not shown). A description is now given of constituents that are different from those of the coating system 1 according to the first embodiment. The coating system 1 according to the present embodiment includes a conveyance apparatus 25 for a film F, and a pressing apparatus 13.

The conveyance apparatus 25 includes a pair of rail members 253 arranged on both sides of the coating apparatus 4 in the X direction. Each rail member 253 extends in the Y direction. A slider 252 is engaged with each rail member 253. The sliders 252 reciprocate in the Y direction while being guided by the rail members 253. A linear motor, a ball screw mechanism that uses a motor as a driving source, or the like can be used as a moving mechanism for the sliders 252. A grip unit 250 is attached to each slider 252 via a support member 251 that extends in the up-down direction. The grip units 250 include a pair of grip members 250*a* that releasably grips an end of the film F, and the pair of grip members 250*a* is opened or closed by an actuator such as a motor (not shown).

The pressing apparatus 13 includes a pair of rail members 133 arranged on both sides of the coating apparatus 4 in the X direction. Each rail member 133 extends in the Y direction. A slider 132 is engaged with each rail member 133. The sliders 132 reciprocate in the Y direction while being guided by the rail members 133. A linear motor, a ball screw mechanism that uses a motor as a driving source, or the like can be used as a moving mechanism for the sliders 132. Each slider 132 has an elevator mechanism that raises or lowers a support shaft 131. The elevator mechanism is, for example, a rack and pinion mechanism that uses a motor as a driving source. The support shafts 131 extend in the Z direction, and pressing rollers 130 are supported by bottom ends thereof. The pressing rollers 130 are supported by the support shafts 131 in such a manner that they can rotate around the X axis.

A curved frame 134 is mounted on the outer side of each lower member 53R, 53L in the X direction. The curved frames 134 extend in the Y direction while curving in the Z direction along the support surfaces 53*a*. The positions of the top surfaces of the curved frames 134 are slightly lower than the support surfaces 53*a*. The curved frame 134 and the pressing roller 130 oppose each other in the Z direction; in a preparation state, they are separated from each other, whereas in a pressing stage, the support shaft 131 is lowered, and thus the pressing roller 130 is lowered to be on the curved frame 134. At this time, the top surfaces of the curved frames 134 function as surfaces for guiding the rolling motion of the pressing rollers 130, and also function as reaction force receiving surfaces that receive a pressing reaction force.

FIG. 15 to FIG. 20 are diagrams illustrating the operations of the conveyance apparatus 25 and the pressing apparatus 13, and are equivalent to the processes of FIG. 5 and FIG. 6 according to the first embodiment.

Figure 15:
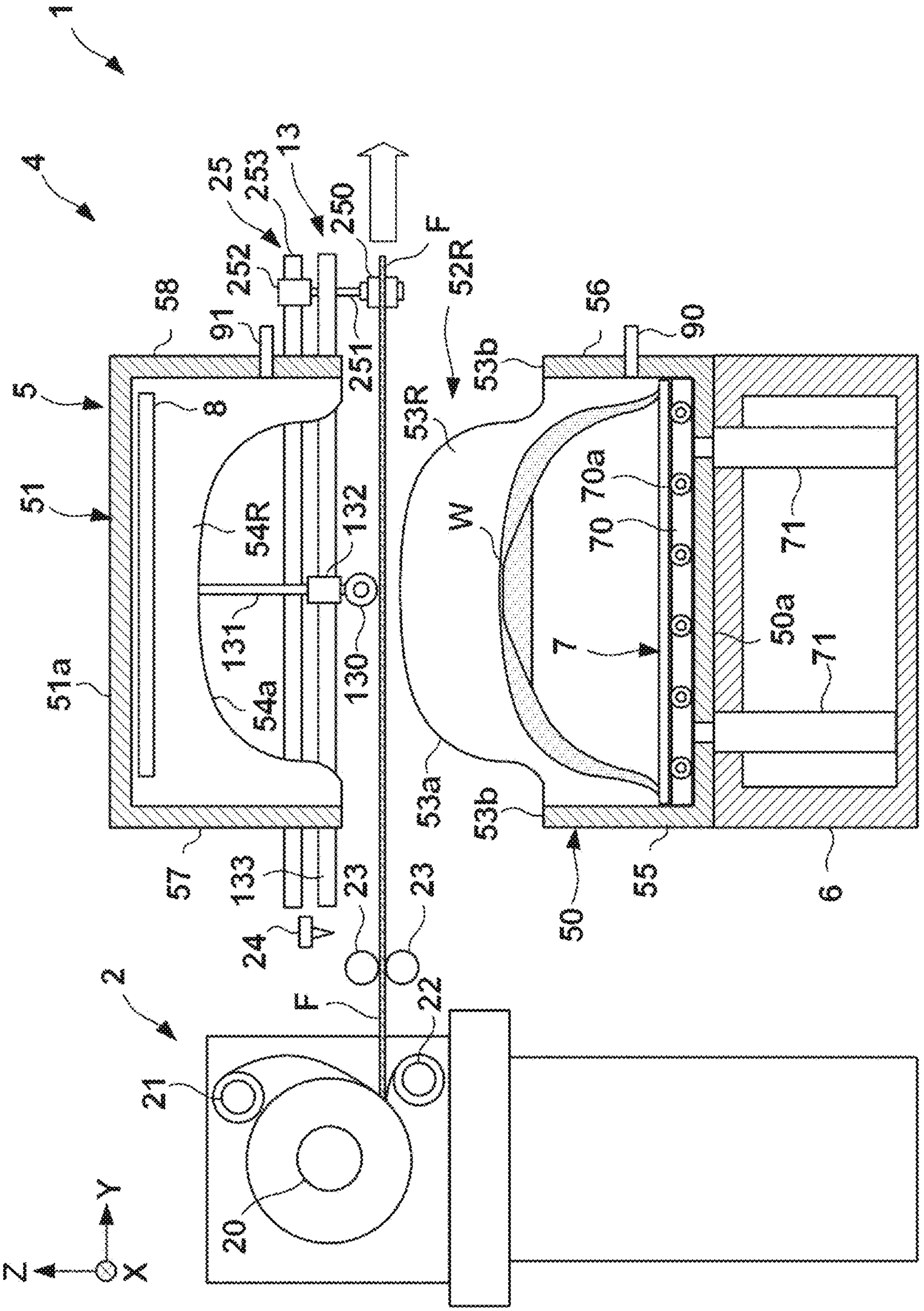
FIG. 15 is a diagram illustrating the operations according to the example of FIG. 13.
Figure 16:
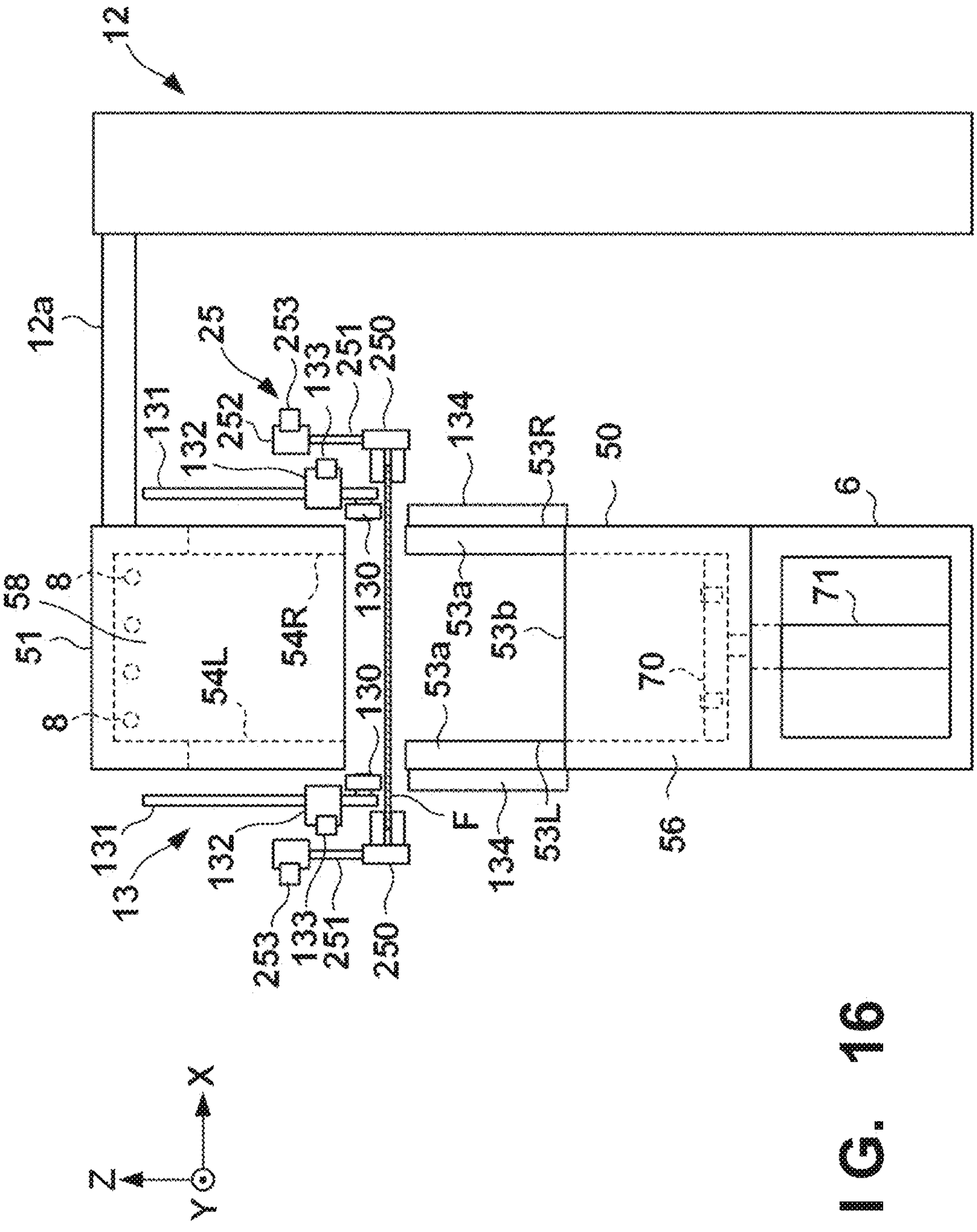
FIG. 16 is a diagram illustrating the operations according to the example of FIG. 13.

FIG. 15 and FIG. 16 show a process of conveying the film F to above a work to be coated W. When each slider 252 is moved in the Y direction in a state where each grip unit 250 is gripping an end of the film F, the film F is pulled out horizontally from the film supply apparatus 2.

Figure 17:
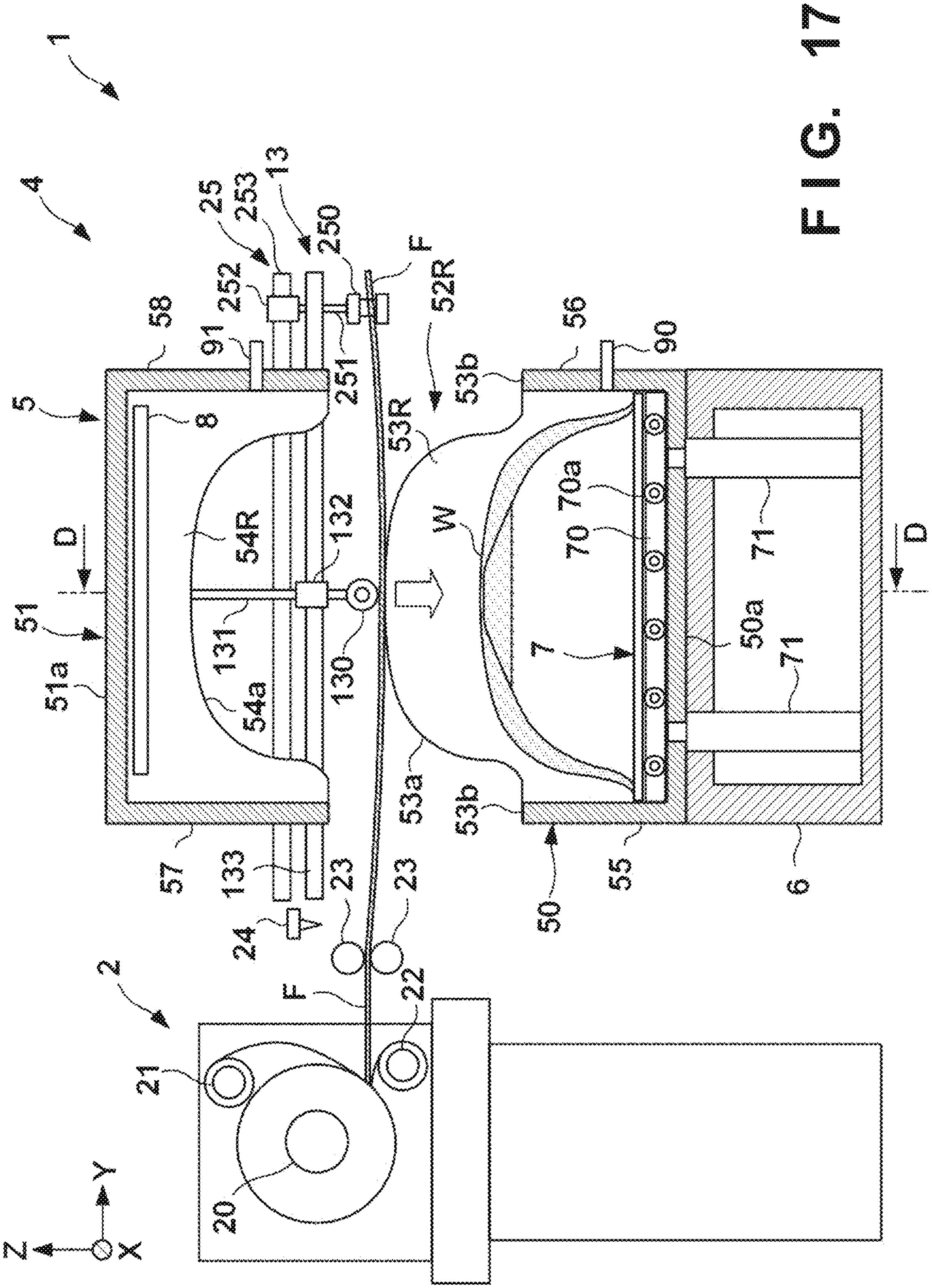
FIG. 17 is a diagram illustrating the operations according to the example of FIG. 13.
Figure 18:
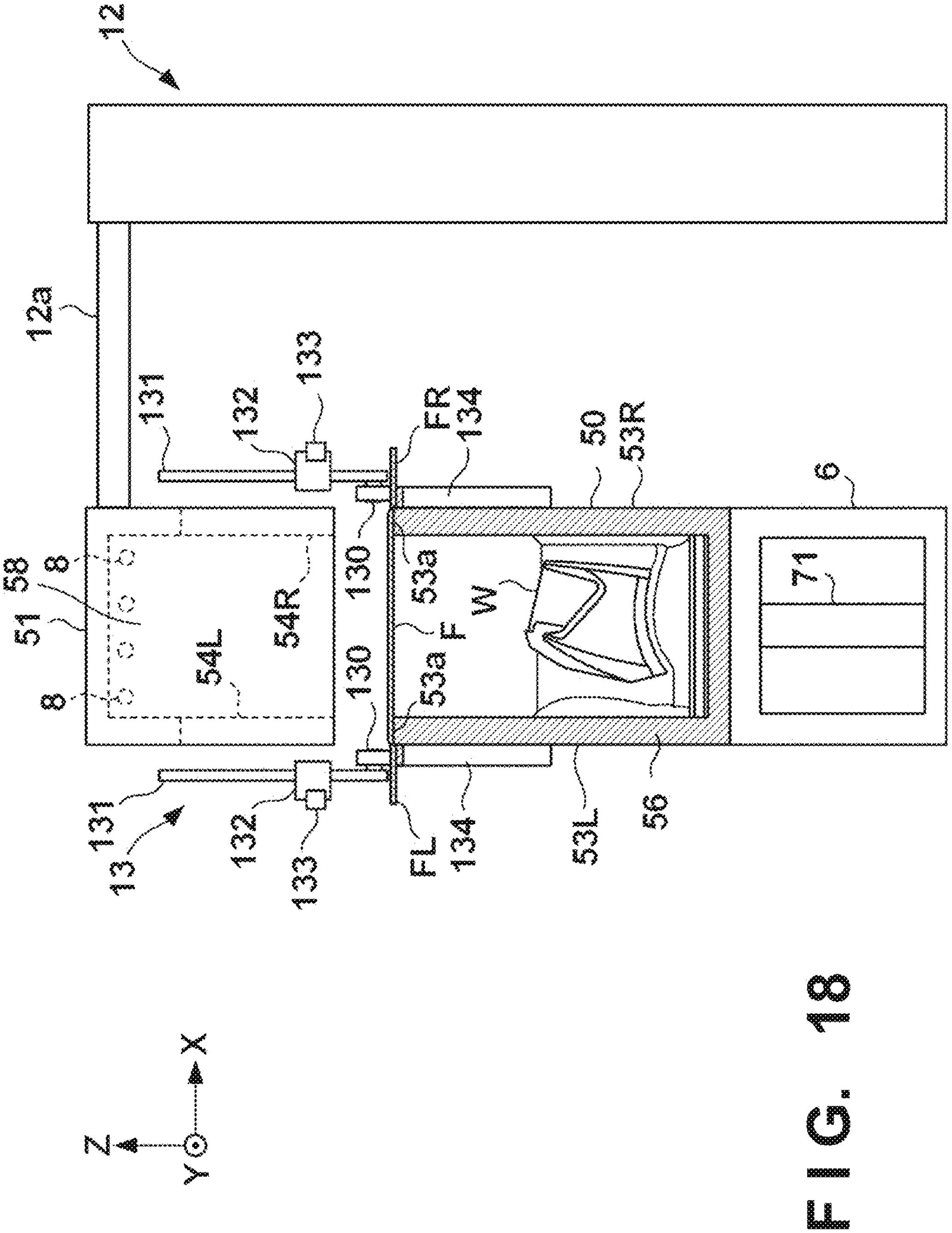
FIG. 18 is a diagram illustrating the operations according to the example of FIG. 13.

Next, a transition is made to a process of pressing the film F against the support surfaces 53*a* with use of the pressing apparatus 13. Reference is made to FIG. 17 and FIG. 18. FIG. 18 is equivalent to a cross-sectional diagram taken along the line D-D of FIG. 17. Each support shaft 131 is lowered, and each pressing roller 130 is lowered to be on the curved frame 134. The ends FR and FL of the film Fare each sandwiched between the corresponding pressing roller 130 and curved frame 134. The film F is pressed against the support surfaces 53*a* in the central portions of the support surfaces 53*a* in the Y direction. Thereafter, gripping of the film F by the grip units 250 is released.

Figure 19:
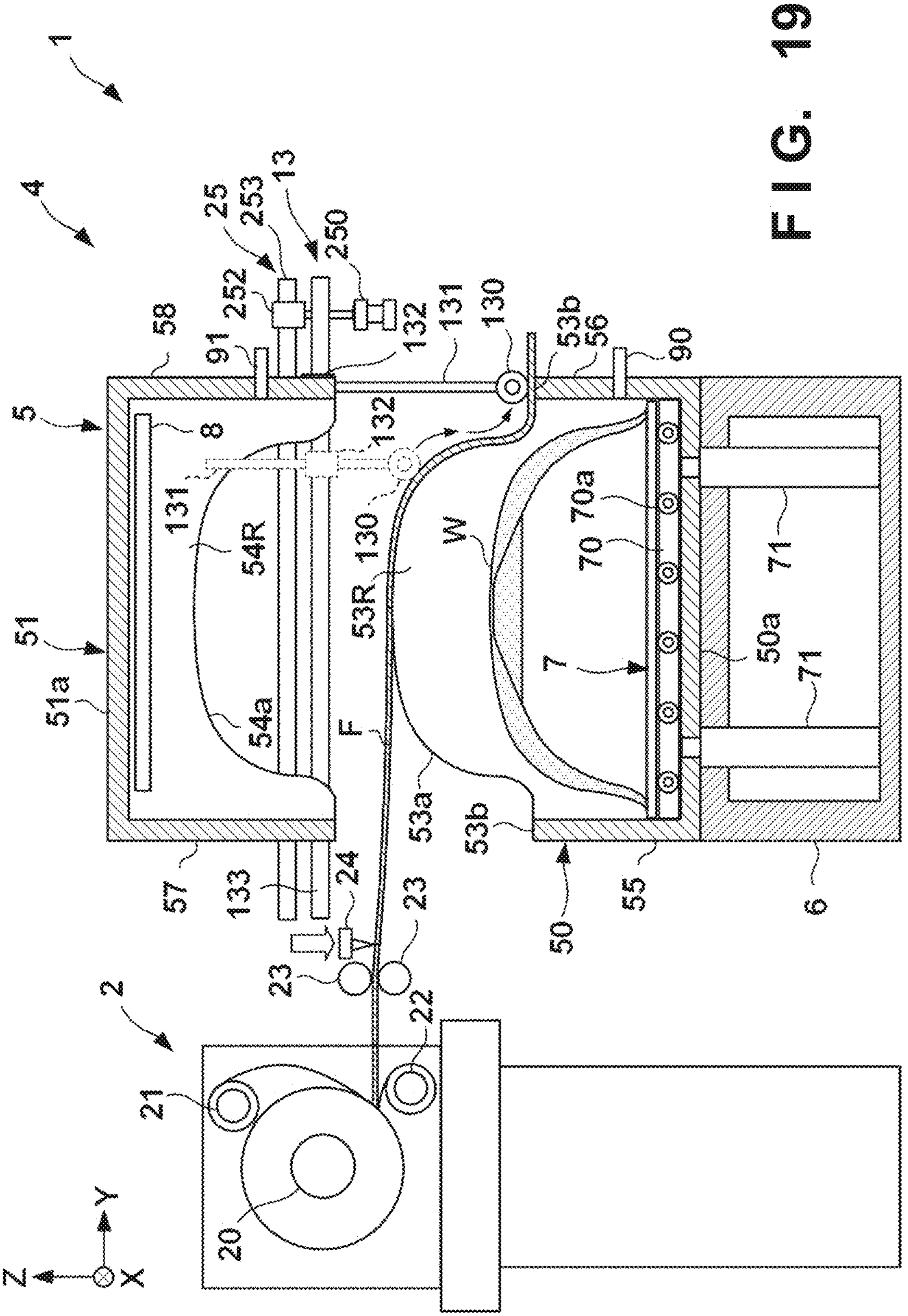
FIG. 19 is a diagram illustrating the operations according to the example of FIG. 13.
Figure 20:
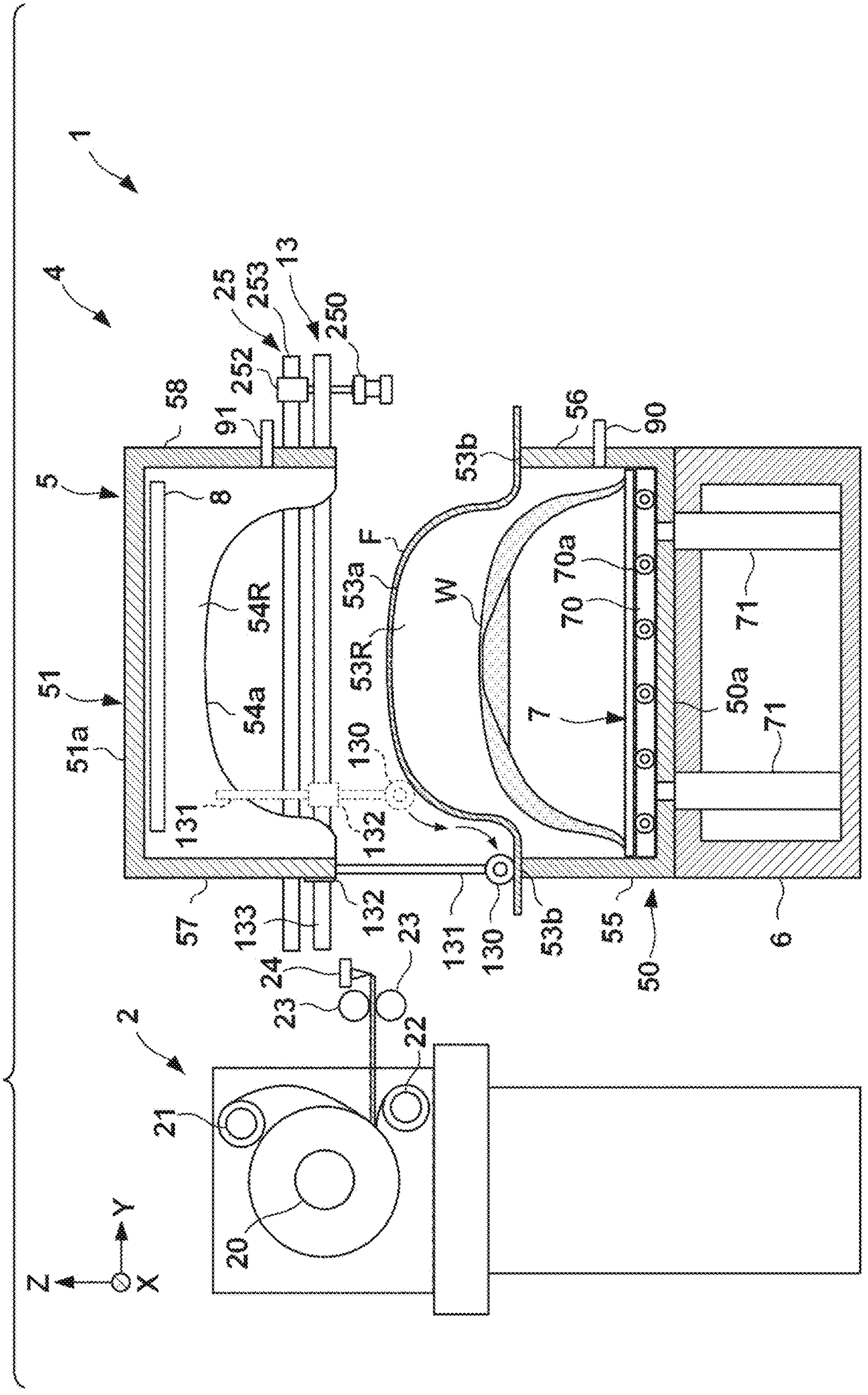
FIG. 20 is a diagram illustrating the operations according to the example of FIG. 13.

Next, as shown in FIG. 19, the sliders 132 are moved in the Y direction while lowering the support shafts 131, hence lowering the pressing rollers 130; this causes the pressing rollers 130 to exhibit a rolling motion on the curved frames 134 via the film F. As a result, the film F is pressed against the support surfaces 53*a* and the support surface 53*b* of the wall portion 56, from the central portions of the support surfaces 53*a* in the Y direction through to the support surface 53*b*. Next, after the pressing rollers 130 are restored to the position of FIG. 17 and the film F is cut by the cutter 24, the sliders 132 are moved in the Y direction while lowering the support shafts 131, hence lowering the pressing rollers 130, as shown in FIG. 20; this causes the pressing rollers 130 to exhibit a rolling motion on the curved frames 134 via the film F. As a result, the film F is pressed against the support surfaces 53*a* and the support surface 53*b* of the wall portion 55, from the central portions of the support surfaces 53*a* in the Y direction through to the support surface 53*b*.

The foregoing leads to a state where the film F adheres to the support surfaces 53*a* and 53*b*, hence a state where the top of the lower space forming member 50 has been sealed, similarly to the stage of FIG. 7 according to the first embodiment. Subsequent work processes are similar to those of the first embodiment.

(Second Exemplary Configuration)

Figure 21:
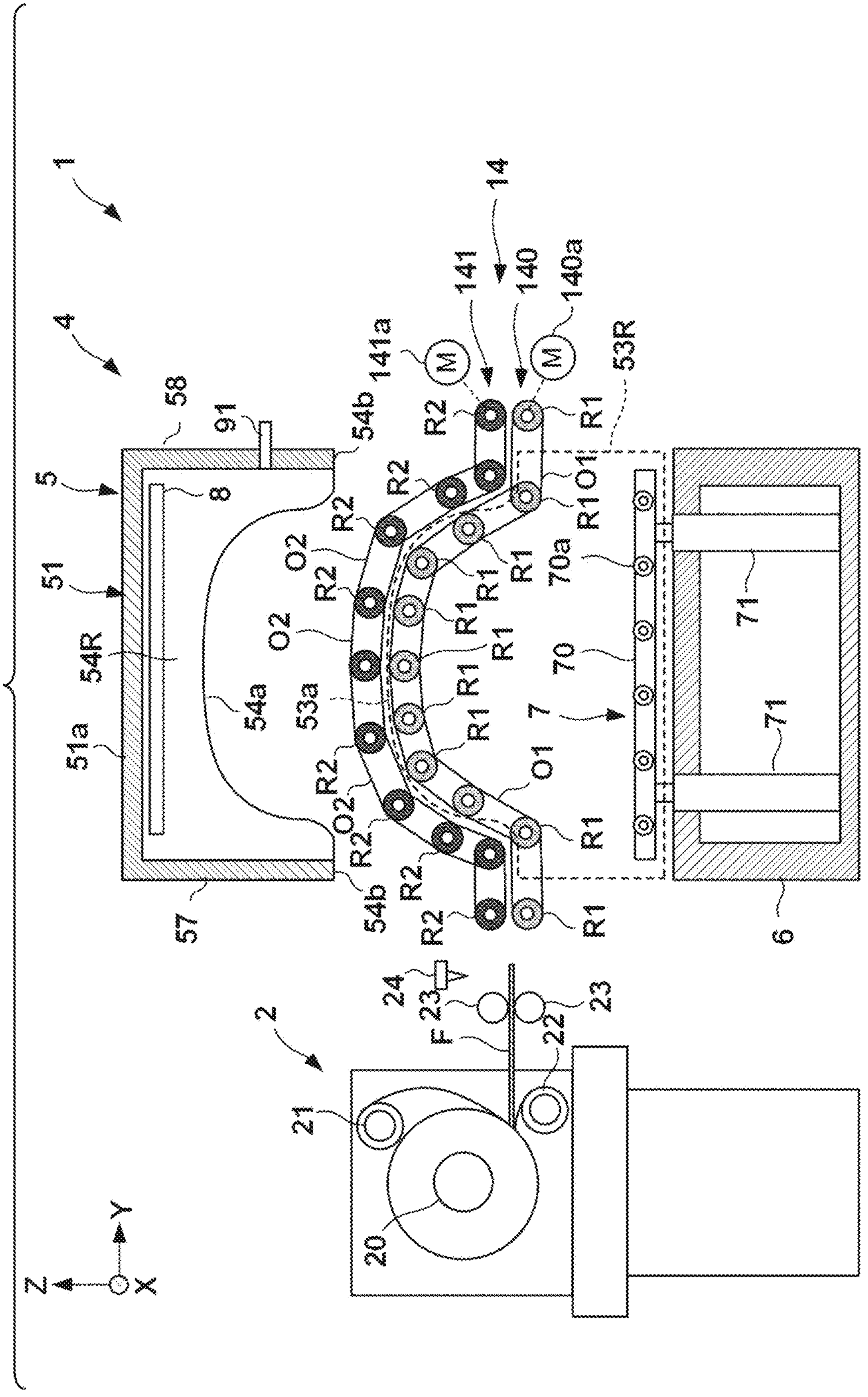
FIG. 21 is a schematic diagram showing another example of a film conveyance mechanism.
Figure 22:
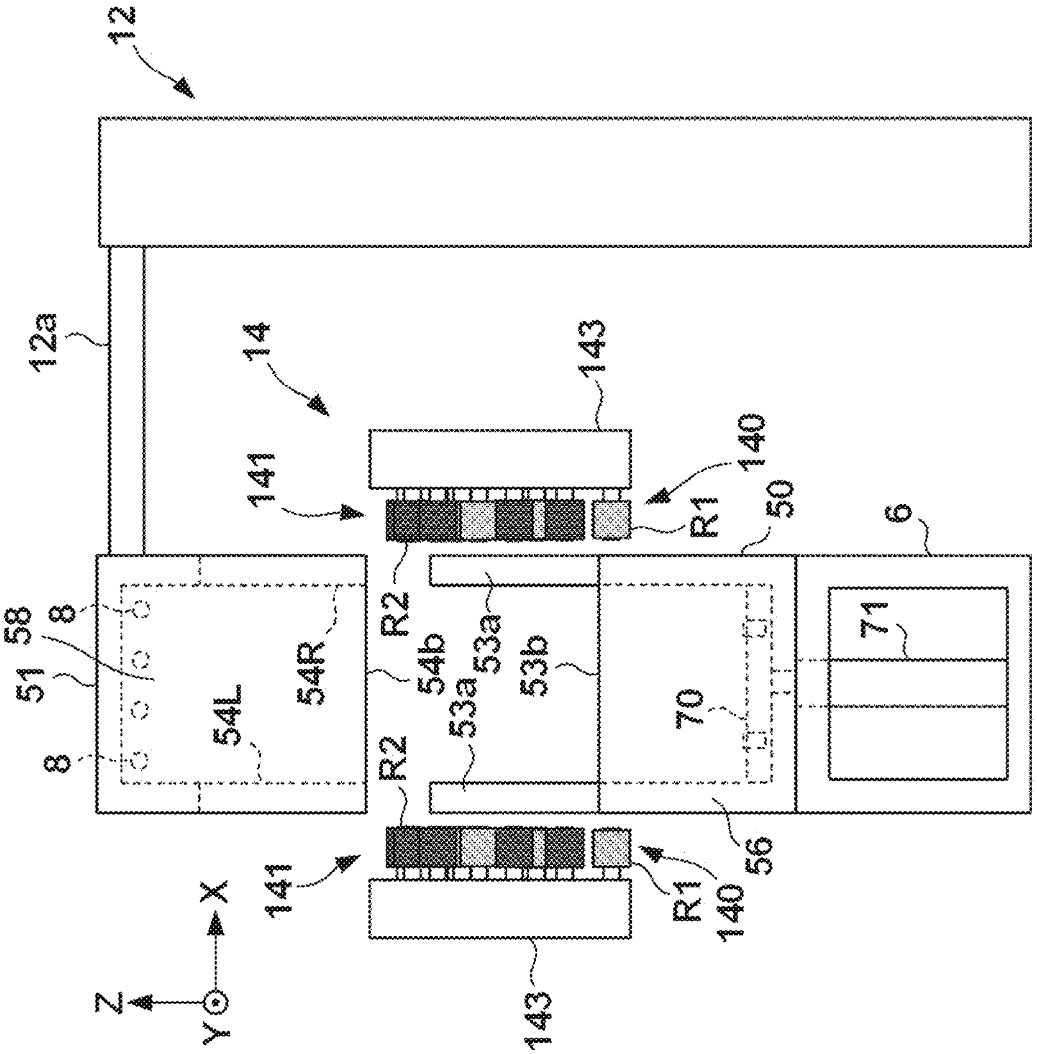
FIG. 22 is an external view of the coating apparatus, and shows another example of the film conveyance mechanism.

FIG. 21 and FIG. 22 show another exemplary configuration for conveying a film F to above a work to be coated W. Note that the illustration of the work to be coated W is omitted in these figures, and only the outline of the lower member 53R of the lower space forming member 50 is indicated by a dash line in FIG. 21.

In the first exemplary configuration, the processes of two stages, in which the film F is pulled out horizontally and thereafter pressed by the pressing rollers 130, are implemented; however, in the present exemplary configuration, the film F is conveyed along the support surfaces 53*a*.

The conveyance apparatus 14 includes lower roller trains 140, upper roller trains 141, and driving units 143 arranged on both sides of the coating apparatus 4 in the X direction. The lower roller trains 140 include a plurality of rollers R1 arrayed along the support surfaces 53*a*, and the upper roller trains 141 include a plurality of rollers R2 arrayed along the support surfaces 53*a*.

Each of the rollers R1 and the rollers R2 is rotatably supported by the driving units 143, and the driving units 143 include motors 140*a* and 141*a* as driving sources. The motor 140*a* causes one roller R1 among the plurality of rollers R1 to rotate as a driving roller, and other rollers R1 rotate as followers as the driving force is transmitted thereto via O-rings O1. Similarly, the motor 141*a* causes one roller R2 among the plurality of rollers R2 to rotate as a driving roller, and other rollers R2 rotate as followers as the driving force is transmitted thereto via O-rings O2. Note that the illustration of the O-rings O1 and O2 is omitted in FIG. 21.

Figure 23A:
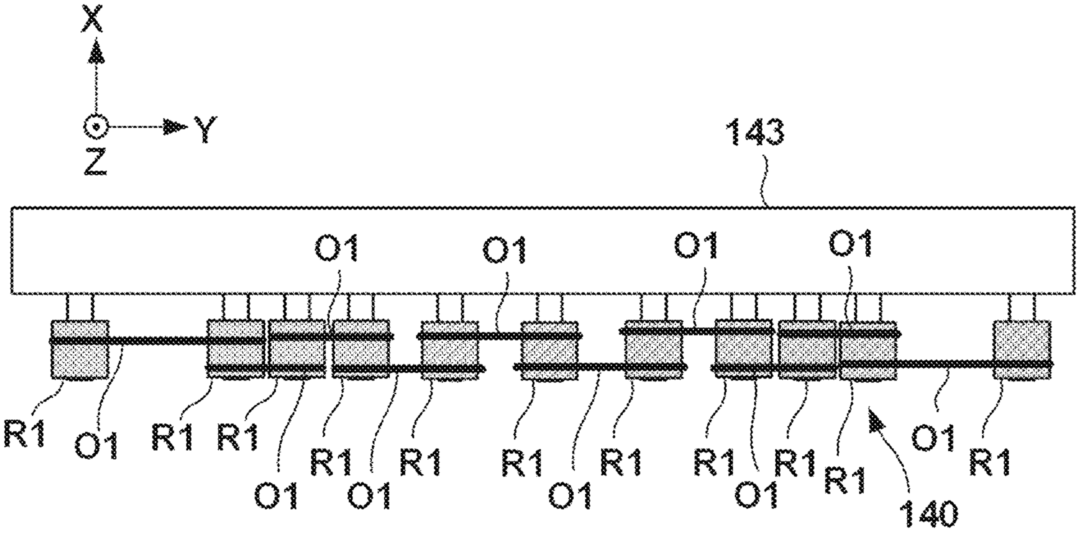
FIG. 23A and FIG. 23B are diagrams illustrating exemplary configurations of roller trains and O-rings.

FIG. 23A is a plan view of one of the lower roller trains 140, and shows a form of placement of the O-rings O1. Note that the other lower roller train 140 is configured in a similar manner. Two neighboring rollers R1 share one O-ring O1 wound therearound. Among the rollers R1 in the lower roller train 140, each roller R1 other than the two rollers R1 located at both ends in the Y direction has two O-rings O1 wound therearound.

Figure 23B:
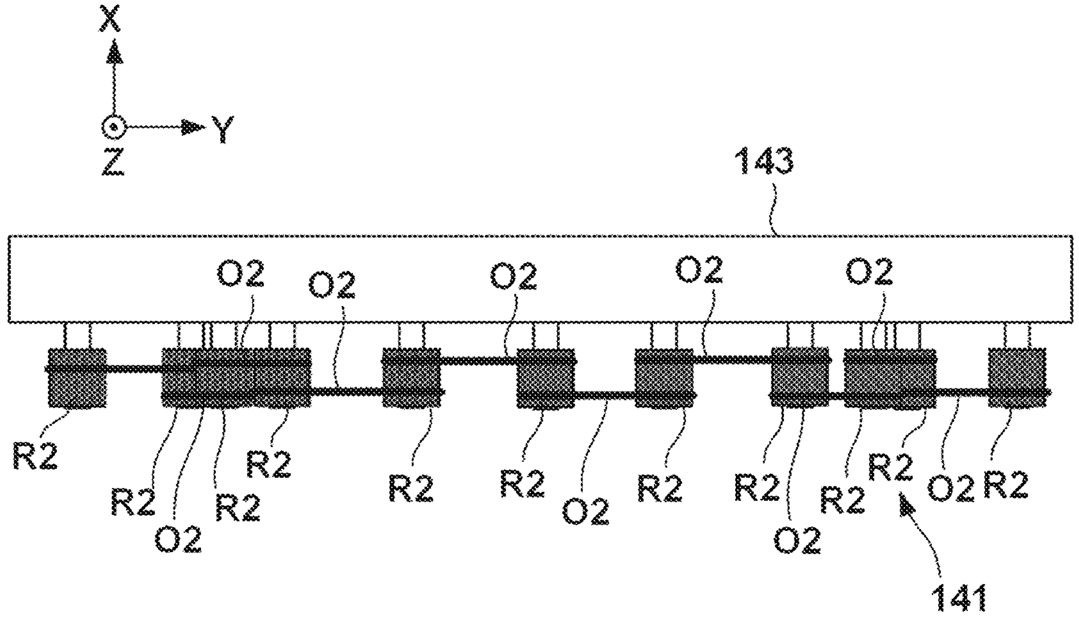

FIG. 23B is a plan view of one of the upper roller trains 141, and shows a form of placement of the O-rings O2. Note that the other upper roller train 141 is configured in a similar manner. Two neighboring rollers R2 share one O-ring O2 wound therearound. Among the rollers R2 in the upper roller train 141, each roller R2 other than the two rollers R2 located at both ends in the Y direction has two O-rings O2 wound therearound.

A film F fed from the film supply apparatus 2 is conveyed in the Y direction while the ends thereof (FR and FL) in the X direction are each held between the lower roller train 140 and the upper roller train 141. More specifically, the film F is conveyed in the Y direction in such a manner that the ends thereof in the X direction are sandwiched between the O-rings O1 in the lower roller trains 140 and the O-rings O2 in the upper roller trains 141.

A conveyance path formed by the lower roller trains 140 and the upper roller trains 141 has been designed so that it is positioned slightly higher than the support surfaces 53*a* while extending along the support surfaces 53*a*. In the case of the present exemplary configuration, after the film F has been conveyed to above the work to be coated W, the chamber 5 is placed in the closed state as exemplarily shown in FIG. 8A and FIG. 8B of the first embodiment; consequently, the film F is supported on the support surfaces 53*a*, and placed in the form exemplarily shown in FIG. 8A and FIG. 8B. Subsequent work processes are similar to those of the first embodiment.

Note that although the present exemplary configuration is a configuration in which the film F is conveyed while being sandwiched between the O-rings O1 and the O-rings O2, it is also permissible to adopt a configuration in which the film F is conveyed directly by the rollers R1 and R2 without using the O-rings O1 and O2.

(Third Exemplary Configuration)

Figure 24:
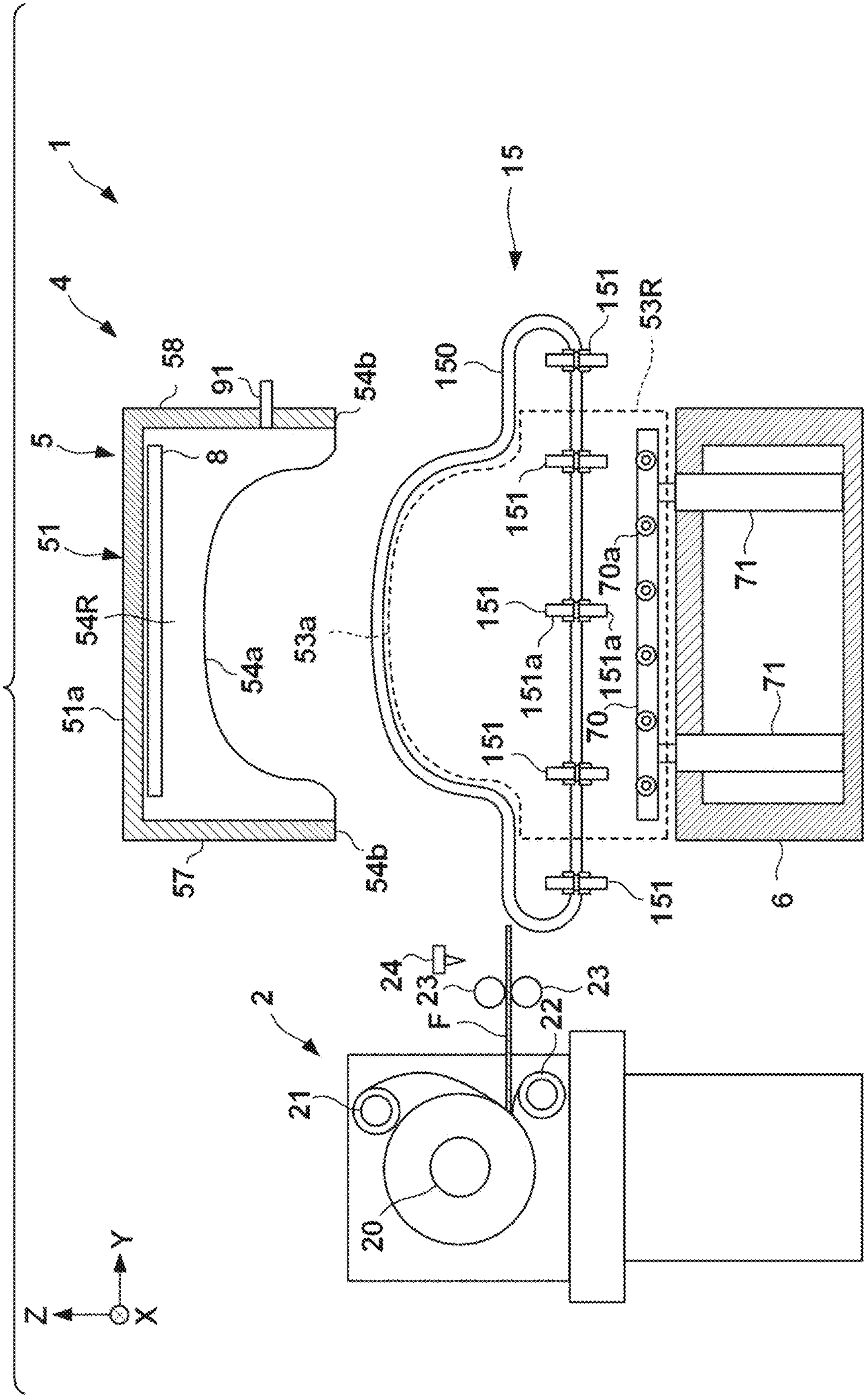
FIG. 24 is a schematic diagram showing still another example of a film conveyance mechanism.
Figure 25:
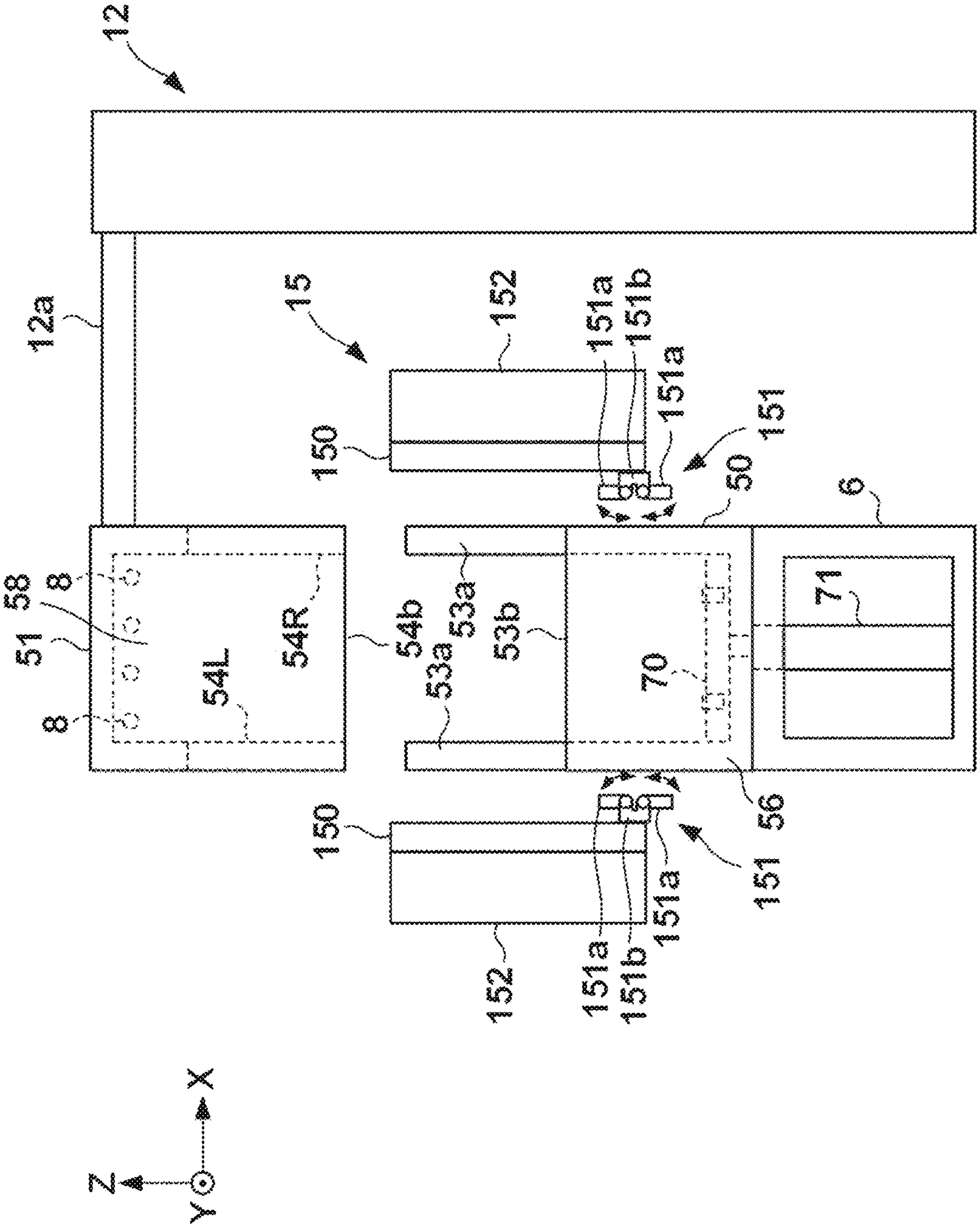
FIG. 25 is an external view of the coating apparatus, and shows still another example of the film conveyance mechanism.

FIG. 24 and FIG. 25 show still another exemplary configuration for conveying a film F to above a work to be coated W. In the first exemplary configuration, the processes of two stages, in which the film F is pulled out horizontally and thereafter pressed by the pressing rollers 130, are implemented; in the present exemplary configuration, the film F is conveyed along the support surfaces 53*a* similarly to the second exemplary configuration. Note that the illustration of the work to be coated W is omitted in these figures, and only the outline of the lower member 53R of the lower space forming member 50 is indicated by a dash line in FIG. 24.

The conveyance apparatus 15 includes rail members 150 arranged on both sides of the coating apparatus 4 in the X direction. The rail member 150 is configured to form an endless guiding track (circulating track), and the profile of a part (upper part) of this guiding track is curved along the support surface 53*a*.

A plurality of grip units 151 are engaged with each rail member 150. In the case of the present embodiment, five grip units 151 are engaged with one rail member 150. When the five grip units 151 are to be distinguished from one another, they are referred to as grip units 151A to 151E. Each grip unit 151 includes a pair of grip members 151*a* that releasably grips an end of the film F. An actuator such as a motor (not shown) causes the pair of grip members 250*a* to open or close by turning around the Y axis as indicated by arrows in FIG. 25. FIG. 24 and FIG. 25 show a case where the pairs of grip members 151*a* are in an open state (a state where gripping has been released).

Driving units 152 cause the grip units 151 to move in a circulative manner along the rail members 150. The driving units 152 are, for example, chain mechanisms that use a motor as a driving source, and each grip unit 151 is attached to an endless chain. In the case of the present embodiment, each grip unit 151 moves counterclockwise in a circulative manner as in FIG. 26.

Figure 26:
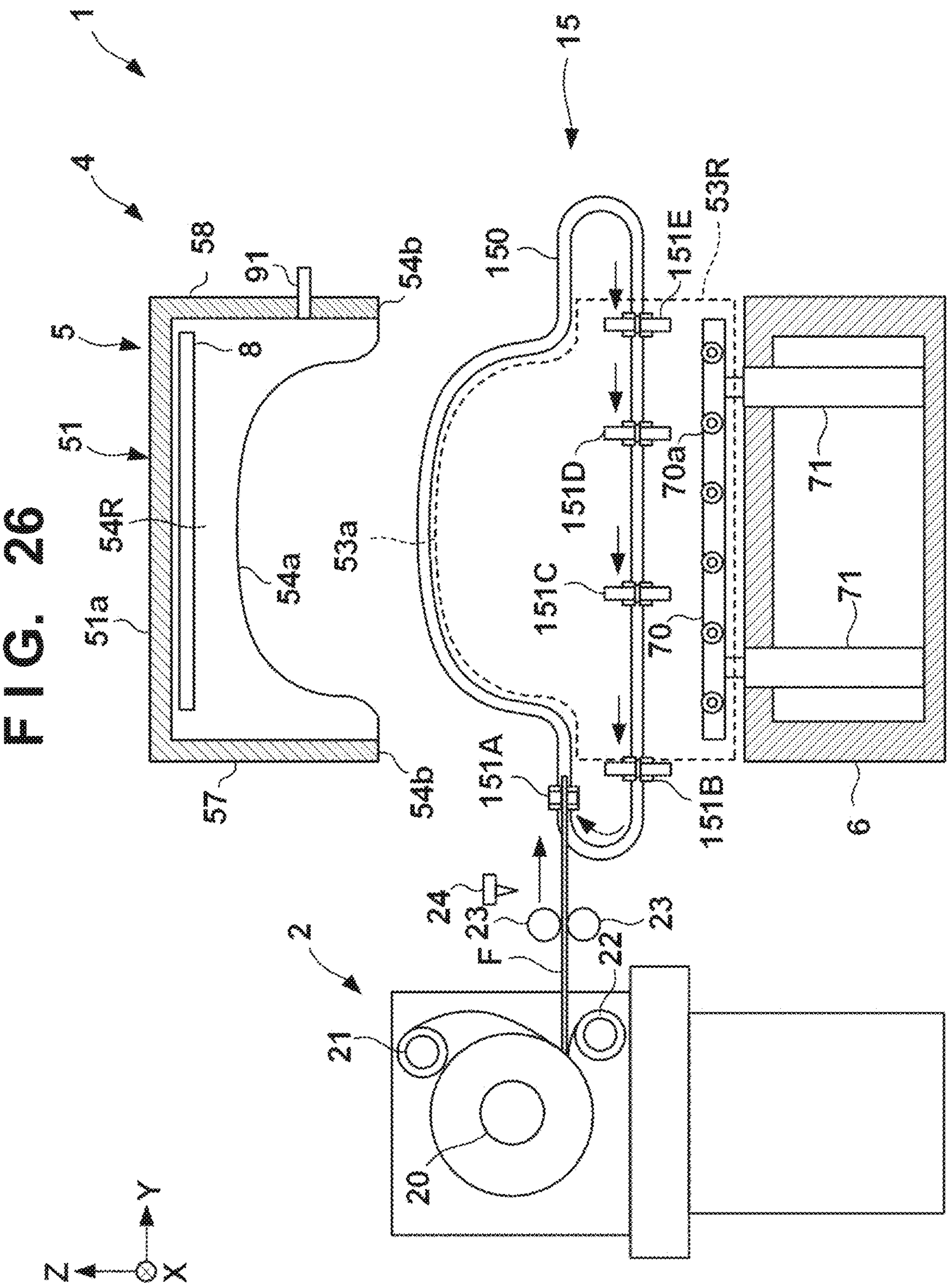
FIG. 26 is a diagram illustrating the operations according to the example of FIG. 24.
Figure 27:
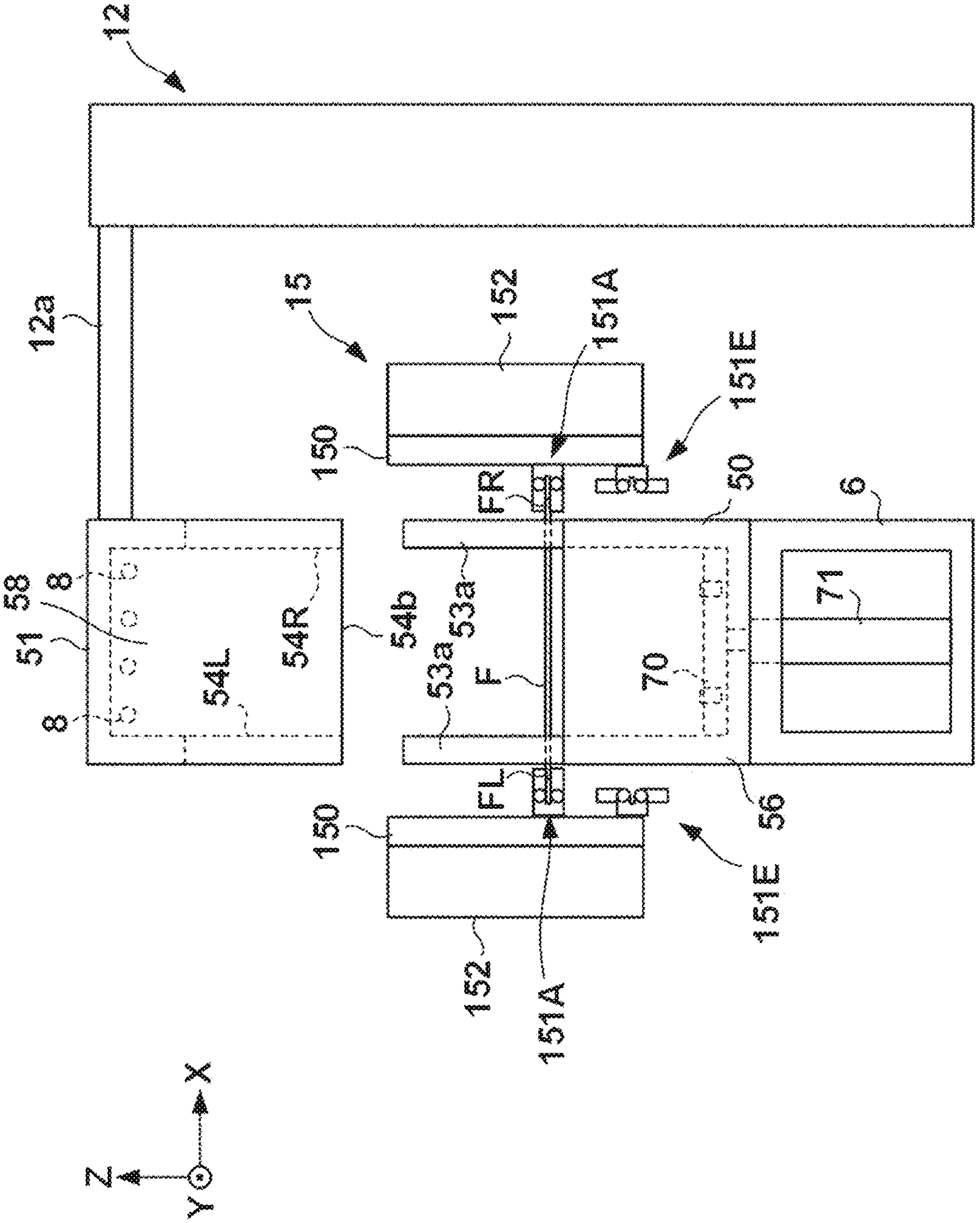
FIG. 27 is a diagram illustrating the operations according to the example of FIG. 24.

FIG. 26 to FIG. 30 are diagrams illustrating the operations of the conveyance apparatus 15. The driving units 152 arranged on both sides of the coating apparatus 4 operate in synchronization with each other. FIG. 26 and FIG. 27 show a state where the lead grip units 151A are gripping the film F. After the grip units 151A have moved to positions to grip the film F, the pairs of grip members 151*a* thereof grip the film F by turning to be in a closed state (gripping state). One of the left and right grip units 151A grips an end FR of the film F, and the other grips an end FL thereof.

Figure 28:
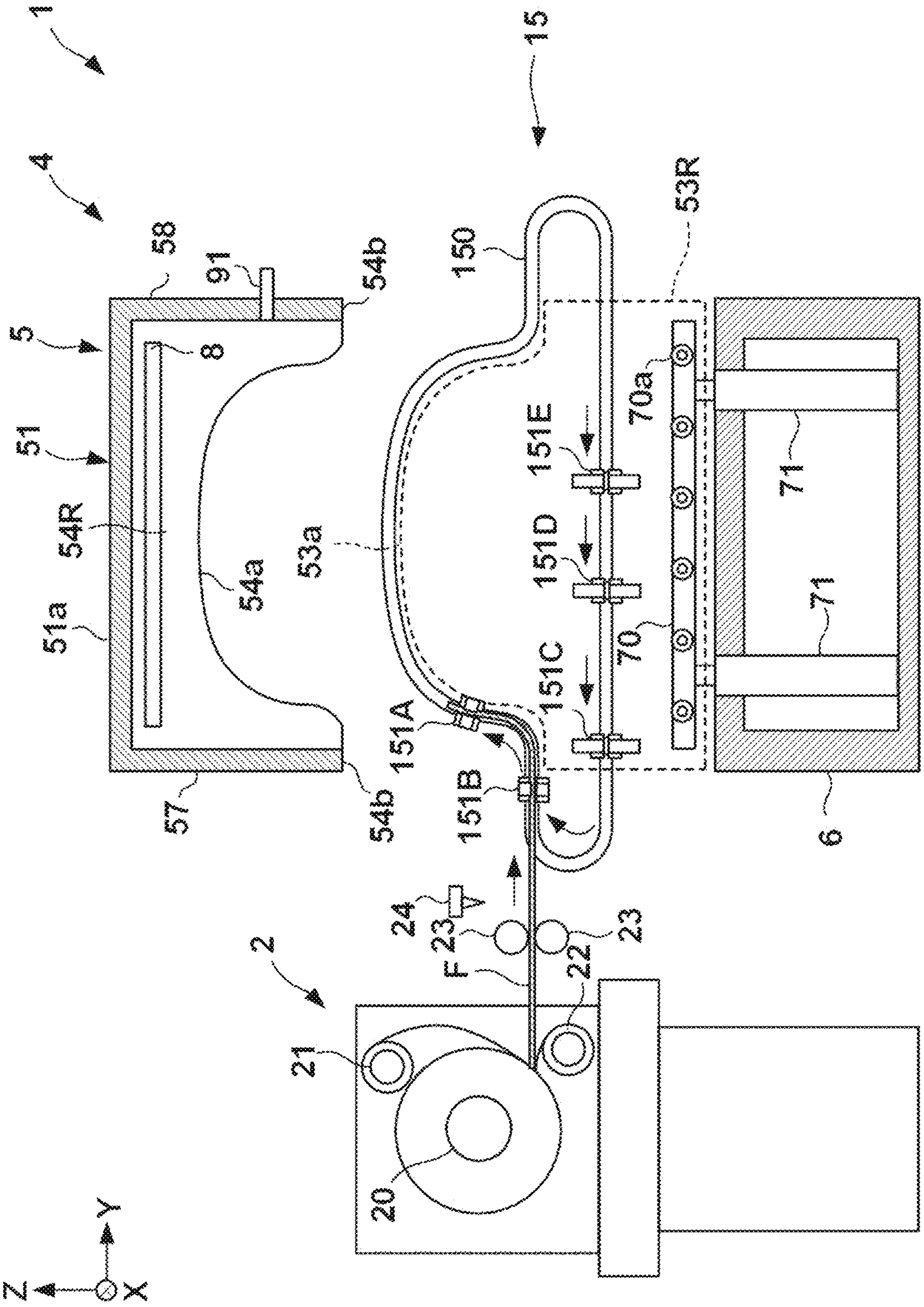
FIG. 28 is a diagram illustrating the operations according to the example of FIG. 24.
Figure 29:
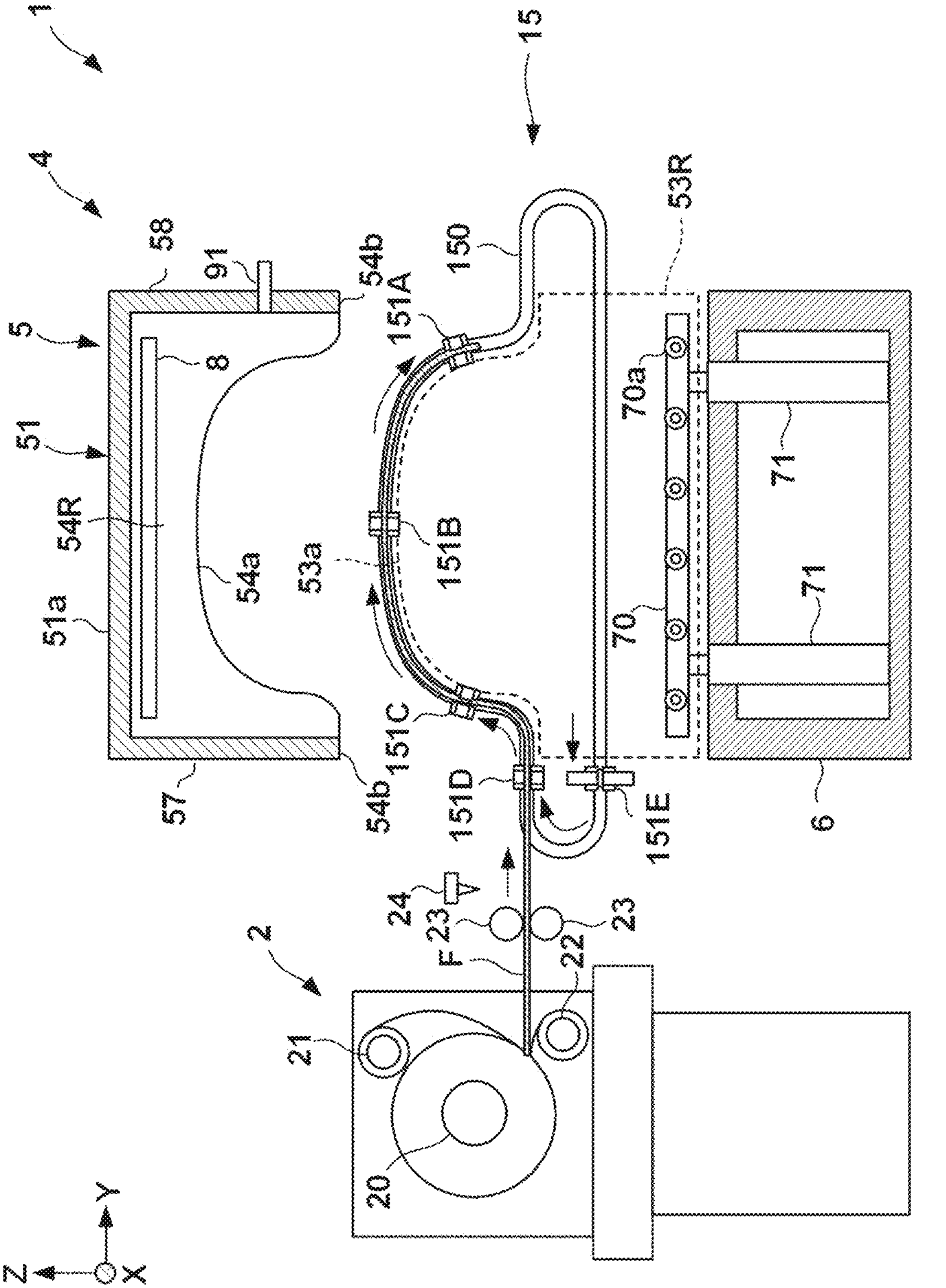
FIG. 29 is a diagram illustrating the operations according to the example of FIG. 24.

Each grip unit 151 is moved; FIG. 28 shows a state where the second grip units 151B are gripping the film F. In this way, each grip unit 151 grips the film F in sequence while moving. FIG. 29 shows a state where the fourth grip units 151D are gripping the film F, and FIG. 30 shows a state where the film F has been cut by the cutter 24 and the fifth grip units 151E are gripping the film F.

Figure 30:
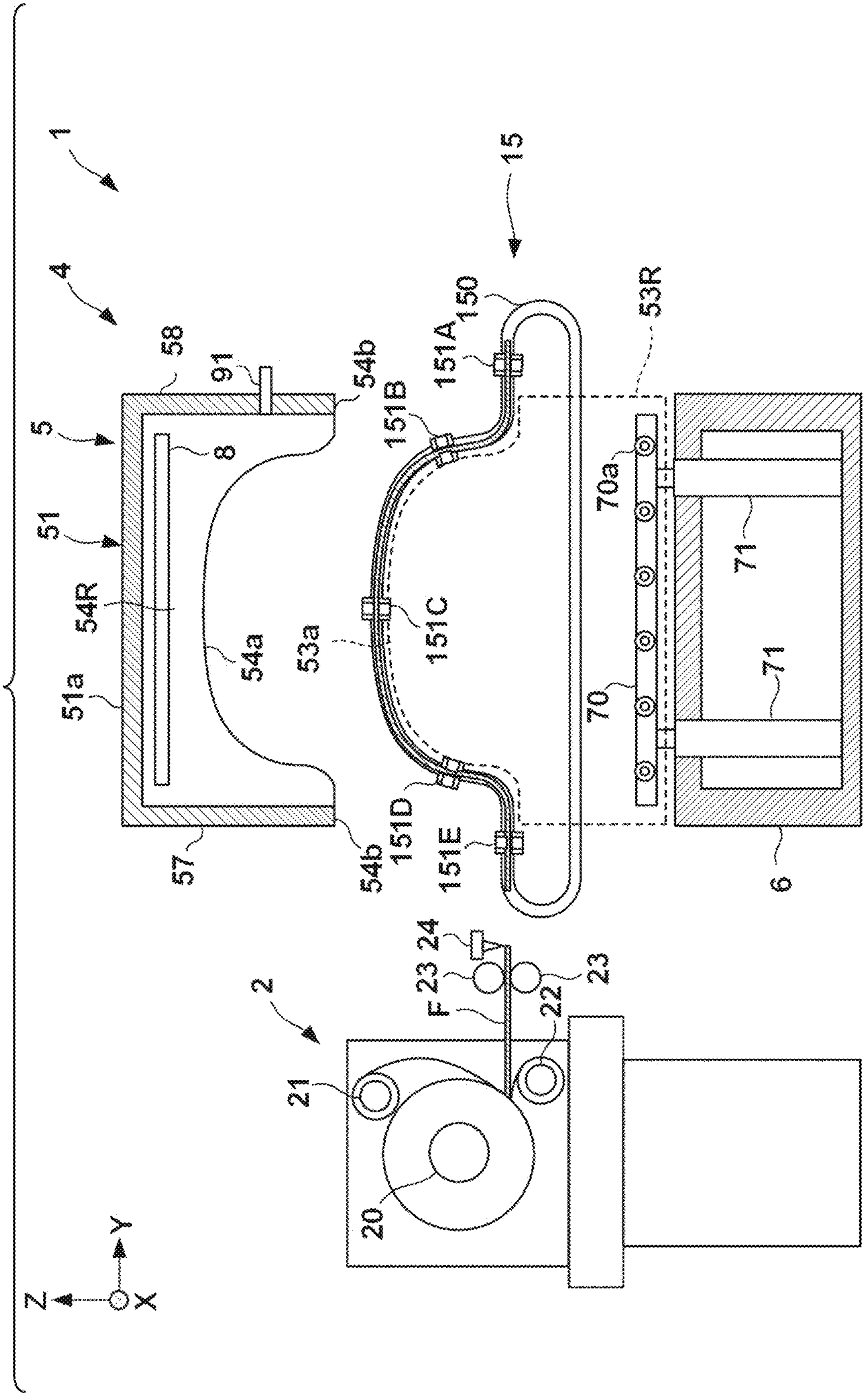
FIG. 30 is a diagram illustrating the operations according to the example of FIG. 24.

In the stage of FIG. 30, the conveyance of the film F is completed. The film F is held by the grip units 151A to 151E at positions slightly higher than the support surfaces 53*a* while curving along the support surfaces 53*a*. In the case of the present exemplary configuration, after the film F has been conveyed to above the work to be coated W, the chamber 5 is placed in the closed state as exemplarily shown in FIG. 8A and FIG. 8B of the first embodiment; consequently, the film F is supported on the support surfaces 53*a*, and placed in the form exemplarily shown in FIG. 8A and FIG. 8B. Subsequent work processes are similar to those of the first embodiment; during these work processes, gripping by each grip unit 151 is released, and the grip units 151 are restored to the positions of FIG. 24.

Fourth Embodiment

Although the coating apparatus 4 has been described to be a vacuum-forming coating apparatus in each of the above-described embodiments, it is also permissible to adopt a method in which the inside of the chamber 5 is not depressurized during formation of (coating with) a film F. That is to say, it is permissible to adopt a method in which a coating process is completed in the stage of pushing up the work to be coated W against the film F, which is exemplarily shown in FIG. 9A and FIG. 10A. Alternatively, it is permissible to adopt a method in which a vacuum-forming coating apparatus is used as the coating apparatus 4, but the stage of pushing up the work to be coated W against the film F, which is exemplarily shown in FIG. 9A and FIG. 10A, is omitted, and the process of coating the work to be coated W with the film F using the difference in atmospheric pressure, which is exemplarily shown in FIG. 9B and FIG. 10B, is performed.

Although the contact surfaces 54*a* are composed of surfaces that curve along the support surfaces 53*a* in each of the above-described embodiments, the form of the contact surfaces 54*a* is not limited to this. It is sufficient that the film F be held between the contact surfaces 54*a* and the support surfaces 53*a*, and the contact surfaces 54*a* may be surfaces that have been formed so that they are discontinuous and have gaps in the Y direction. In a case where a vacuum-forming method is used in this exemplary configuration, it is sufficient to secure the airtightness of the internal space of the chamber 5 using another configuration.

While an embodiment has been described, the invention is not limited to the foregoing embodiments, and various variations/changes are possible within the spirit of the invention.

What is claimed is:

1. A coating apparatus comprising:

a conveyance unit configured to convey a film to above a work to be coated;

a first lower member having a first support surface curved in an up-down direction along a conveying direction of the film, and configured to support a first end of the film conveyed above the work from below;

a first upper member configured to sandwich the first end of the film together with the first lower member;

a second lower member having a second support surface curved in the up-down direction along the conveying direction, and configured to support a second end of the film, which is opposite to the first end, conveyed above the work from below; and a second upper member configured to sandwich the second end of the film together with the second lower member, wherein each of the first lower member and the second lower member includes a lower body portion; and a lower interchangeable portion detachably attached to the lower body portion, each of the first support surface and the second support surface is formed by the lower interchangeable portion, and the lower interchangeable portion attached to the lower body portion is selected from a plurality of members having different curve profiles.

2. The coating apparatus according to claim 1, wherein each of the first support surface and the second support surface curves in the up-down direction along an outline of the work to be coated.

3. The coating apparatus according to claim 1, wherein the first upper member includes a first contact surface, the second upper member includes a second contact surface, and each of the first contact surface and the second contact surface extends in the conveying direction while curving in the up-down direction along a corresponding support surface, and contacts the film from above.

4. The coating apparatus according to claim 3, wherein each of the first upper member and the second upper member includes an upper body portion; and an upper interchangeable portion detachably attached to the upper body portion, and each of the first contact surface and the second contact surface is formed by the upper interchangeable portion.

5. The coating apparatus according to claim 1, comprising:

a pressing unit configured to press the film conveyed by the conveyance unit against the first support surface and the second support surface.

6. The coating apparatus according to claim 1, wherein the conveyance unit includes a grip unit configured to grip the film, and a rail configured to guide a movement of the grip unit along the first support surface and the second support surface.

7. The coating apparatus according to claim 1, wherein the conveyance unit includes a plurality of rollers arranged along the first support surface and the second support surface.

8. The coating apparatus according to claim 1, comprising:

a chamber configured to form an upper space and a lower space, the lower space housing the work therein;

a heating unit configured to heat the film;

an atmospheric pressure adjustment unit including a pump and valves and configured to adjust atmospheric pressures in the upper space and the lower space; and an elevator unit configured to raise or lower the work, wherein the chamber includes a lower space forming member including the first lower member and the second lower member, and configured to form the lower space, and an upper space forming member, movable upward and downward, to the lower space forming member, that includes the first upper member and the second upper member and forms the upper space.

* * * * *